(12) United States Patent
Jomatsu et al.

(10) Patent No.: US 12,199,740 B2
(45) Date of Patent: Jan. 14, 2025

(54) FRAME GENERATION METHOD AND FRAME GENERATION DEVICE

(71) Applicant: Socionext Inc., Kanagawa (JP)

(72) Inventors: Katsuhiro Jomatsu, Yokohama (JP); Yoshinobu Matsumura, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 214 days.

(21) Appl. No.: 17/701,193

(22) Filed: Mar. 22, 2022

(65) Prior Publication Data

US 2022/0224428 A1 Jul. 14, 2022

Related U.S. Application Data

(63) Continuation of application No. PCT/JP2020/036928, filed on Sep. 29, 2020.

(60) Provisional application No. 62/908,333, filed on Sep. 30, 2019.

(51) Int. Cl.
| | |
|---|---|
| *H04N 7/16* | (2011.01) |
| *H04H 60/07* | (2008.01) |
| *H04N 21/236* | (2011.01) |
| *H04N 21/643* | (2011.01) |
| *H04N 21/647* | (2011.01) |

(52) U.S. Cl.
CPC ...... *H04H 60/07* (2013.01); *H04N 21/23614* (2013.01); *H04N 21/64322* (2013.01); *H04N 21/64776* (2013.01)

(58) Field of Classification Search
CPC ........ H04H 60/07; H04H 20/28; H04H 60/11; H04N 21/23614; H04N 21/64322; H04N 21/64776; H04N 21/42607; H04N 21/4382
See application file for complete search history.

(56) References Cited

U.S. PATENT DOCUMENTS

| | | | |
|---|---|---|---|
| 6,859,459 B1* | 2/2005 | Yamashita | H04L 12/4625 370/254 |
| 8,339,968 B2* | 12/2012 | Howe | H04N 19/89 370/242 |
| 2010/0034140 A1* | 2/2010 | Song | H04N 21/4382 370/328 |

(Continued)

FOREIGN PATENT DOCUMENTS

| | | |
|---|---|---|
| JP | 2017-092671 A | 5/2017 |
| WO | 2017/122544 A1 | 7/2017 |

OTHER PUBLICATIONS

International Search Report (ISR) and Written Opinion of the International Searching Authority (ISA) issued on Dec. 28, 2020 in International (PCT) Application No. PCT/JP2020/036928, with English translation.

(Continued)

*Primary Examiner* — Annan Q Shang
(74) *Attorney, Agent, or Firm* — Rimon P.C.

(57) ABSTRACT

A frame generation method includes: demodulating a digital broadcast signal that is based on a received digital broadcast wave; generating a packet including content information obtained in the demodulating; and generating a transmission frame including appended information and the packet. The appended information includes received information that is obtained in the demodulating. The received information is information other than the content information.

10 Claims, 31 Drawing Sheets

(56) References Cited

U.S. PATENT DOCUMENTS

| | | | |
|---|---|---|---|
| 2010/0146541 A1* | 6/2010 | Velazquez | H04N 21/4882 725/33 |
| 2014/0245362 A1* | 8/2014 | Holley | H04N 21/4622 725/98 |
| 2015/0181501 A1* | 6/2015 | Soga | H04L 27/0012 370/252 |
| 2015/0195111 A1* | 7/2015 | Kobatake | H04L 27/0008 375/343 |
| 2017/0238160 A1* | 8/2017 | Takahashi | H04N 21/23614 455/404.1 |
| 2018/0176637 A1* | 6/2018 | Cho | H04N 21/2362 |
| 2018/0359520 A1 | 12/2018 | Takahashi et al. | |

OTHER PUBLICATIONS

Test Stream Format for Advanced Digital Satellite Broadcasting A-PAB Technical Report, A-PAB TR-001, Version 1.1, Sep. 5, 2017, The Association for Promotion of Advanced Broadcasting Services, <https://www.apab.or.jp/4k-8k/pdf/A-PAB_TR-001_V1.1_170905.pdf> with its partial English translation.

* cited by examiner

FIG. 10D

| ETHER frame header | TS packet | TS packet | TS packet | Appended information | Appended information | Appended information | CRC |

FRAME GENERATION METHOD AND FRAME GENERATION DEVICE

CROSS REFERENCE TO RELATED APPLICATIONS

This is a continuation application of PCT International Application No. PCT/JP2020/036928 filed on Sep. 29, 2020, designating the United States of America, which is based on and claims priority of U.S. Provisional Patent Application No. 62/908,333 filed on Sep. 30, 2019. The entire disclosures of the above-identified applications, including the specifications, drawings, and claims are incorporated herein by reference in their entirety.

FIELD

The present disclosure relates to a frame generation method and a frame generation device.

BACKGROUND

Digital broadcasting service replaced the conventional analog broadcasting service in Japan in the early 2000s. In recent years, advanced digital broadcasting schemes with higher transmission efficiency than their conventional counterparts have been considered to achieve higher resolution broadcasting, for example. Non Patent Literature (NPL) 1 discloses a type length value (TLV) packet data format that is used in advanced digital broadcasting.

CITATION LIST

Non Patent Literature

NPL 1: Test Stream Format for Advanced Digital Satellite Broadcasting, A-PAB Technical Report TR-001 version 1.1 (Sep. 5, 2017), The Association for Promotion of Advanced Broadcasting Services, [search date: Sep. 13, 2019], [online], Internet: <https://www.apab.or.jp/4k-8k/pdf/A-PAB_TR-001_V1.1_170905.pdf>

SUMMARY

Technical Problem

However, a frame generation method and a frame generation device which generate transmission frames based on received digital broadcast waves can be improved upon.

Solution to Problem

A frame generation method according to one aspect of the present disclosure includes: demodulating a first digital broadcast signal that is based on a received digital broadcast wave; generating a first packet including content information obtained in the demodulating of the first digital broadcast signal; and generating a first transmission frame including appended information and the first packet, the appended information including first received information obtained in the demodulating of the first digital broadcast signal, the first received information being information other than the content information.

A frame generation device according to one aspect of the present disclosure includes: a demodulation core unit configured to demodulate a digital broadcast signal that is based on a received digital broadcast wave; a packet generation unit configured to generate a packet including content information obtained via demodulation by the demodulation core unit; and a frame generation unit configured to generate a transmission frame including appended information and the packet, the appended information including received information obtained via the demodulation by the demodulation core unit, the received information being information other than the content information.

Advantageous Effects

One aspect of the present disclosure achieves an improved frame generation method and the like.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10D illustrates a fourth example of a structure of an ETHER frame generated by the reception module according to Embodiment 2.

DESCRIPTION OF EMBODIMENTS

Figure 1:
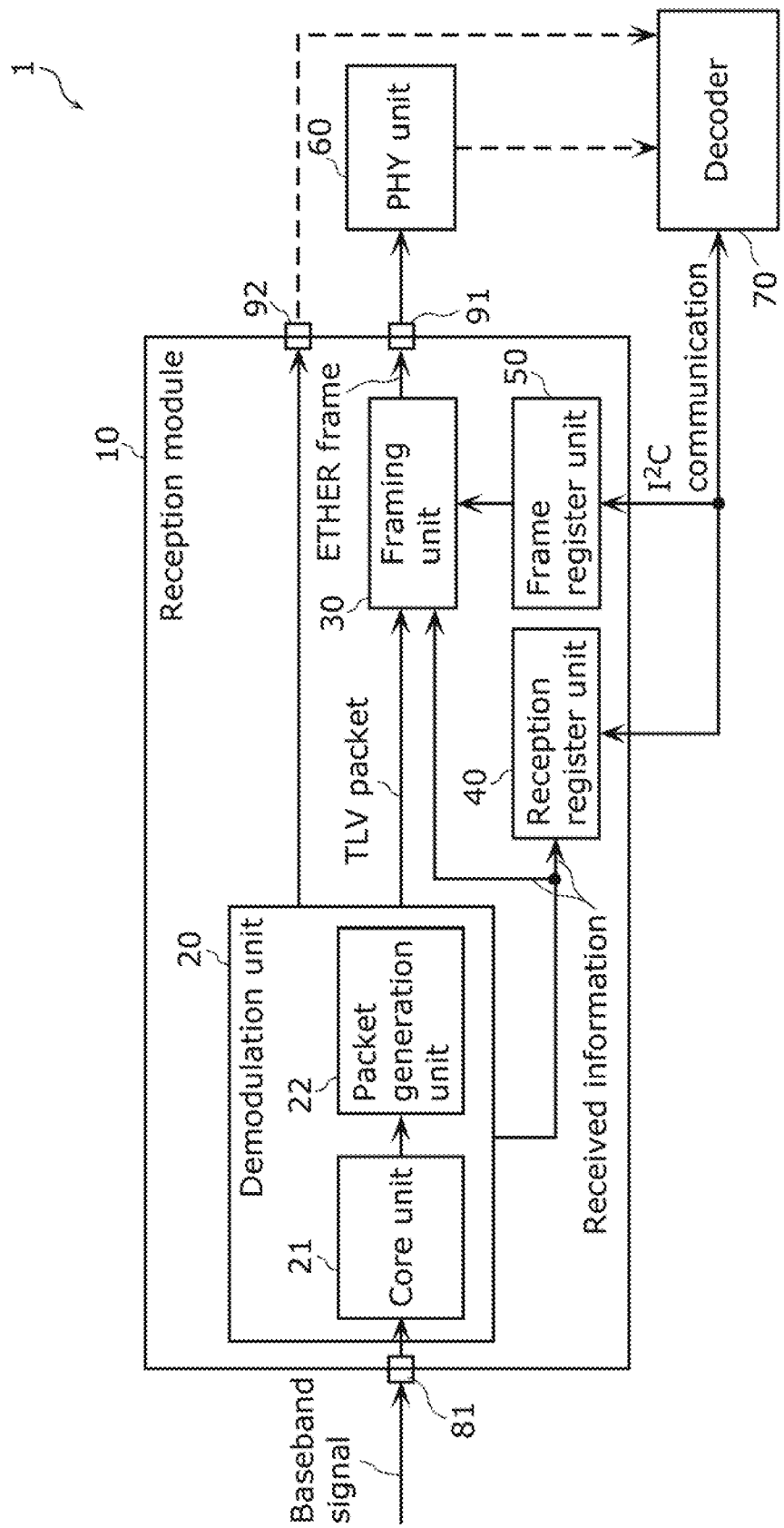
FIG. 1 is a block diagram illustrating a functional configuration of a reception system according to Embodiment 1.

A frame generation method according to one aspect of the present disclosure includes: demodulating a first digital broadcast signal that is based on a received digital broadcast wave; generating a first packet including content information obtained in the demodulating of the first digital broadcast signal; and generating a first transmission frame including appended information and the first packet, the appended information including first received information obtained in the demodulating of the first digital broadcast signal, the first received information being information other than the content information.

With this, the first transmission frame includes a first packet and first received information corresponding to the first packet. When such a first transmission frame is output, a later-stage device (for example, a decoder) that obtains the first transmission frame can obtain the first received information in addition to the first packet. The frame generation method according to one aspect of the present disclosure can therefore improve the real-time obtainment of the first received information at the later-stage device. The later-stage device can, for example, process the first packet according to the first received information.

For example, the first received information may include at least one of: a signal quality of the digital broadcast wave; an error ratio of the first digital broadcast signal, the error ratio being calculated in the demodulating of the first digital broadcast signal; demodulation synchronization information; a transmission and multiplexing configuration and control (TMCC) signal, interference signal detection information; or an emergency warning broadcast signal.

This enables the later-stage device to obtain at least one of a signal quality, an error ratio, demodulation synchronization information, a TMCC signal, interference signal detection information, or an emergency warning broadcast signal simultaneously with the first packet, when the first transmission frame is output.

For example, the first received information may include at least one of the signal quality or the error ratio.

As a result, when the first transmission frame is output to the later-stage device, the later-stage device can obtain at least one of the signal quality or the error ratio corresponding to the first packet in conjunction with the obtainment of the first packet. Stated differently, the later-stage device can obtain the first packet and at least one of the signal quality or the error ratio corresponding to the first packet in real time. Accordingly, since inconsistencies due to timing differences between the obtainment of the first packet and the obtainment of the first received information can be inhibited in the determining of the quality of the first packet, the determination of the quality of the first packet in the later-stage device can be performed more accurately.

For example, the first packet may be a type length value (TLV) packet.

Broadcast waves in TLV format are adopted in, for example, advanced BS 4K/8K broadcasting. This can improve the real-time obtainment of the first received information in the later-stage device when the digital broadcast wave is an advanced digital broadcast wave.

For example, the first packet may be a transport stream (TS) packet.

TS format broadcast waves are adopted in, for example, digital terrestrial television broadcasting or 2K satellite broadcasting. This can improve the real-time obtainment of the first received information in the later-stage device when the digital broadcast wave is a digital terrestrial television broadcast wave, for example.

For example, the generating of the first packet may include generating the first packet including a plurality of TS packets each of which is the TS packet, and the generating of the first transmission frame may include generating the first transmission frame further including information indicating a total number of the plurality of TS packets.

This allows a later-stage device to recognize the number of TS packets even when the number of TS packets included in each of the plurality of first transmission frames is different. Accordingly, the first transmission frame can be generated without being limited by the number of TS packets included.

For example, the frame generation method may further include: demodulating a second digital broadcast signal different than the first digital broadcast signal. The appended information may further include second received information obtained in the demodulating of the second digital broadcast signal.

This enables a first transmission frame including appended information of the second packet, which is different from the first packet, to be output to a later-stage device so that processing using the appended information of the second packet can be performed in the later-stage device.

For example, the generating of the first transmission frame may include arranging the appended information at a beginning of an internet protocol (IP) packet in the first transmission frame, the IP packet including the appended information and the first packet.

This allows a later-stage device to select the handling of data after the IP packet header based on the appended information before reading the IP packet header.

For example, the generating of the first transmission frame may include arranging the appended information at an end of an internet protocol (IP) packet in the first transmission frame, the IP packet including the appended information and the first packet.

With this, the frame structure from the preamble to the first packet in the first transmission frame conforms to a standardized frame structure (for example, IEEE 802.3ab), and changes to the frame structure can be minimized.

For example, the generating of the first transmission frame may include calculating a cyclic redundancy check (CRC) for the IP packet and appending CRC information to the IP packet.

This increases the certainty of detecting errors in an IP packet including appended information because the CRC calculation is performed using the appended information as well.

For example, the first transmission frame may be an ETHER frame.

Since this enables the output of both the first transmission frame and the TS packet, a later-stage device can be connected to the reception module that executes the frame generation method regardless of whether the later-stage device is a TS packet format device or an Ethernet (registered trademark, hereinafter the same, hereinafter referred to simply as "ETHER") packet format device. Thus, flexibility regarding the connectability between the later-stage device and the reception module can be improved.

For example, the frame generation method may further include selectively outputting, as the first packet, the first transmission frame including the TS packet or the TS packet.

This makes it possible to reduce the number of terminals of the reception module that executes the frame generation method since the output terminal that outputs the first transmission frame and the TS packet can be shared. Stated differently, it is possible to inhibit the enlargement of the reception module. The size of the reception module can therefore be improved.

For example, the frame generation method may further include: demodulating a second digital broadcast signal different than the first digital broadcast signal; generating a second packet including content information obtained in the demodulating of the second digital broadcast signal; generating a second transmission frame including appended information and the second packet, the appended information including second received information obtained in the demodulating of the second digital broadcast signal, the second received information being information other than the content information; and multiplexing the first transmission frame and the second transmission frame. The generating of the first transmission frame may include generating the first transmission frame including first output destination information about an output destination of the first packet, and the generating of the second transmission frame includes generating the second transmission frame including second output destination information about an output destination of the second packet, the second output destination information being different than the first output destination information.

This allows the first transmission frame and the second transmission frame to be output by a single output terminal, thereby reducing the number of elements, such as terminals, of the reception module that executes the frame generation method. When the frame in which the first transmission frame and the second transmission frame are multiplexed is output to the later-stage device, the later-stage device is capable of separating the first transmission frame from the second transmission frame using the first output destination information and the second output destination information. This means the later-stage device can perform processing tailored to the first transmission frame and processing tailored to the second transmission frame.

For example, each of the first transmission frame and the second transmission frame may be an ETHER frame, and each of the first output destination information and the second output destination information may include at least one of destination information in an Internet protocol (IP) packet header included in the ETHER frame or destination port information in a user datagram protocol (UDP) header included in the ETHER frame.

This allows the first transmission frame and the second transmission frame to be separated from the multiplexed frame by simply checking at least one of the destination information or the destination port information.

For example, the generating of the first packet may include generating the first packet including a plurality of TS packets each of which is the TS packet, and at least two TS packets among the plurality of TS packets may include mutually different packet ID (PID) information.

This enables the two TS packets to be separated in the later-stage device by simply using the PID information originally included in the TS packet without adding information for separating the two TS packets.

For example, the frame generation method may further include delaying generation of the first transmission frame or sending of the first transmission frame to a later-stage device that processes data in the first transmission frame, based on information from the later-stage device.

When a plurality of reception modules that execute the frame generation method are connected to a single later-stage device, this can inhibit the collision of first transmission frames from a plurality of reception modules.

A frame generation device according to one aspect of the present disclosure includes: a demodulation core unit configured to demodulate a digital broadcast signal that is based on a received digital broadcast wave; a packet generation unit configured to generate a packet including content information obtained via demodulation by the demodulation core unit; and a frame generation unit configured to generate a transmission frame including appended information and the packet, the appended information including received information obtained via the demodulation by the demodulation core unit, the received information being information other than the content information.

This achieves the same advantageous effects as the frame generation method described above.

General or specific aspects of the present disclosure may be implemented as a system, a device or apparatus, a method, an integrated circuit, a computer program, or a computer-readable recording medium such as a CD-ROM, or any combination thereof.

Hereinafter, embodiments are described in detail with reference to the drawings.

Each of the following embodiments describes a general or specific example. The numerical values, elements, the arrangement and connection of the elements, steps, order of the steps, etc., shown in the following embodiments are mere examples, and therefore do not limit the scope of the claims. Among elements in the following embodiments, those not recited in any one of the independent claims are described as optional elements.

The figures are not necessarily precise illustrations. In the figures, elements that are essentially the same share like reference signs, and duplicate description thereof is omitted or simplified.

In the present specification, terms indicating relationships between elements, such as "matching", and terms indicating values and numerical ranges do not express only the strict, literal meaning, but also include a range of substantial equivalents, such as a difference of a few percent, for example.

Embodiment 1

1-1. Reception System Configuration

First, a configuration of the reception system according to the present embodiment will be described with reference to FIG. 1 through FIG. 3B. FIG. 1 is a block diagram illustrating the functional configuration of reception system 1 according to the present embodiment. Reception system 1 is a system that receives broadcast waves for digital broadcast (digital broadcast waves) and performs decoding on signals based on the received digital broadcast waves. Broadcast waves may be, for example, digital terrestrial broadcast, advanced wideband digital satellite broadcast, advanced digital broadcasting satellite (BS) broadcast, or advanced wideband digital communication satellite (CS) broadcast waves.

In addition to conventional fixed-length packets (for example, transport stream (TS) packets), variable-length packets (for example, type length value (TLV) packets) can also be transmitted in advanced wideband digital satellite broadcasting. For example, the TLV format is adopted in advanced BS 4K/8K broadcasting, and content streams are stored in TLV packets. In other words, TLV packets include video and audio content information (hereinafter also referred to simply as content information). Broadcast waves are transmitted from, for example, a broadcasting station.

The TS format is adopted in digital terrestrial television broadcasting and 2K satellite broadcasting, and the content stream is stored in TS packets.

Reception system 1 may be provided in, for example, a fixed receiver such as a television receiver, a mobile receiver in a smartphone, mobile phone, or tablet, or in a receiver in a vehicle such as an in-car television receiver.

As illustrated in FIG. 1, reception system 1 includes reception module 10, physical layer (PHY) unit 60, and decoder 70. Reception system 1 may further include, for example, an antenna for receiving broadcast waves and a tuner (RF unit) for extracting predetermined signals from the received broadcast waves and converting the extracted signals. The antenna and tuner are omitted from the drawings. For example, the tuner receives a broadcast wave (analog signal) received by the antenna, generates a baseband signal or an intermediate frequency (IF) signal by frequency conversion of the received broadcast wave, and outputs the generated signal to reception module 10. In the present embodiment, the tuner generates a baseband signal and outputs the generated baseband signal to reception module 10. Note that a baseband signal and an IF signal are examples of a digital broadcast signal.

Reception module 10 generates frames used in ETHER communication based on the digital broadcast signal from the tuner, and outputs the generated frames to decoder 70. Reception module 10 includes demodulation unit 20, framing unit 30, reception register unit 40, frame register unit 50, input terminal 81, and output terminals 91 and 92.

Demodulation unit 20 generates and outputs a predetermined packet based on the baseband signal input to input terminal 81. In the present embodiment, demodulation unit 20 generates a TLV packet. Demodulation unit 20 includes core unit 21 and packet generation unit 22.

Core unit 21 converts the baseband signal input to input terminal 81 from an analog signal to a digital signal and demodulates the analog-to-digital converted baseband signal. Core unit 21 can be said to perform demodulation on the analog-to-digital converted baseband signal. Core unit 21 may further perform error correction processing on the demodulated baseband signal. In the demodulation, core unit 21 may calculate an error ratio (bit error ratio (BER)) of the demodulated baseband signal before error correction. Core unit 21 is one example of the demodulation core unit.

Packet generation unit 22 generates a TLV packet based on the demodulated baseband signal. A TLV packet is, for example, data in TLV packet format.

Demodulation unit 20 obtains information other than the content information based on the demodulated baseband signal. The information other than the content information is information not included in the TLV packet. Hereinafter, this information will also be referred to as received information. The received information includes, for example, information obtained in the demodulation performed by core unit 21. The received information includes, for example, at least one of the following: information indicating the demodulation status, a demodulation synchronization signal, a transmission control signal that controls transmission, or information inserted into the broadcast wave.

The information indicating the demodulation status includes, for example, at least one of signal quality information on the baseband signal or the error ratio before error correction of the demodulated baseband signal. The signal quality information and the error ratio are used to check whether the signal level of the digital broadcast wave received during antenna installation, indoor wiring installation, or TV installation is sufficient. The signal quality information and the error ratio may be used for verifying antenna level, which is a function for verifying reception, of rain attenuation broadcasting during heavy rainfall or during television reception.

The signal quality information is, for example, information based on a monitored carrier-to-noise ratio (C/N ratio) (also referred to as a monitored value), and may include, for example, a determination result of "the reception is good" or "the reception is poor". The determination result is obtained by comparing the monitored value with a predetermined threshold value. The reception is determined to be good when the monitored value is greater than or equal to the predetermined value, and determined to be poor when the monitored value is less than the predetermined value.

The information indicating the demodulation status may also include an interference signal detection signal, which is a signal detected when an interference radio wave or signal is mixed with the received broadcast wave.

The demodulation synchronization signal is a signal used to check for signal synchronization on the decoder 70 side.

The transmission control signal includes, for example, a transmission and multiplexing configuration and control (TMCC) signal. A TMCC signal includes, for example, information indicating the modulation method used for the transmission and information on the format of the stream or packet, and is used in the reception and the decoding.

The information inserted into a broadcast wave includes, for example, an emergency warning broadcast signal. An emergency warning broadcast signal is a signal that interrupts a broadcast wave during a disaster.

Demodulation unit 20 outputs at least one of the various information included in the received information to framing unit 30, and outputs each of the various information included in the received information to reception register unit 40.

Framing unit 30 constructs a transmission format for the signal output from packet generation unit 22. Based on the TLV packet, framing unit 30 generates an ETHER frame, which is one example of a transmission frame for transmitting the data format of the TLV packet. Framing unit 30 generates an ETHER frame by encapsulating the received information obtained by demodulation unit 20 and the register value stored by frame register unit 50 in the ETHER frame. Stated differently, framing unit 30 generates an ETHER frame including a TLV packet, the received information, and a register value (for example, Information about the received information). One characterizing feature is that the received information and register value are included in the ETHER frame. The ETHER frame is, for example, data in the ETHER frame format. The information about the received information includes, for example, information in demodulation unit 20, information (such as signal strength) about the tuner (not illustrated in the drawings) located upstream of, i.e., at an earlier stage than demodulation unit 20, and device information about the antenna.

Framing unit 30 appends a preamble and cyclic redundancy check (CRC) information to a media access control (MAC) frame that adds (encapsulates) information necessary for an ETHER frame, such as a destination MAC address, a source MAC address, an IP packet header, and a UDP packet header, according to set values stored in frame register unit 50. Hereinafter, the generation of an ETHER frame by adding information necessary for an ETHER frame to predetermined information (for example, a TLV packet, the received information, and a register value) is also referred to as "ETHER framing", and in the same vein, the terminology "ETHER framed" may also be used depending on context.

The transmission frame generated by framing unit 30 is not limited to an ETHER frame, and may be a frame used in serial peripheral interface (SPI) communication, secure digital input/output (SDIO) communication, or universal serial bus (USB) communication. The transmission frame may be of any frame format that can achieve high transmission efficiency, such as a frame with a variable-length payload. Note that ETHER frames with high affinity to TLV should be used if receiving TLV format broadcast waves adopted in advanced BS broadcasting such as 4K/8K broadcasting.

Figure 2:
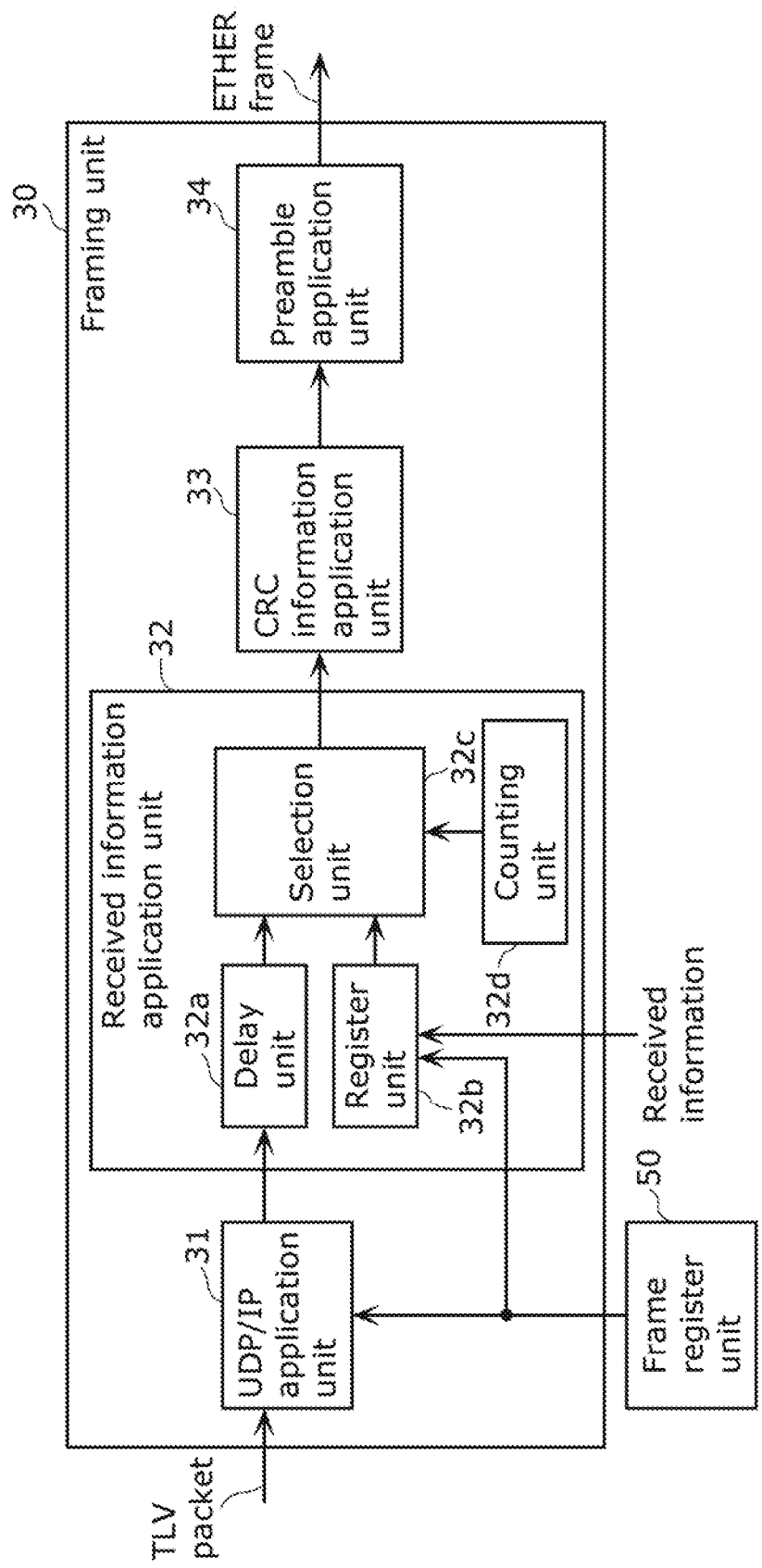
FIG. 2 is a block diagram illustrating a functional configuration of a framing unit according to Embodiment 1.

FIG. 2 is a block diagram illustrating the functional configuration of framing unit 30 according to the present embodiment.

As illustrated in FIG. 2, framing unit 30 includes user datagram protocol (UDP)/internet protocol (IP) application unit 31, received information application unit 32, CRC information application unit 33, and preamble application unit 34. One characterizing feature of the configuration of reception module 10 is the inclusion of received information application unit 32.

UDP/IP application unit 31 inserts UDP/IP header data into the input TLV packet (stream/packet signal). UDP/IP application unit 31 performs delay for the insertion of UDP/IP header data relative to the input TLV packet, counts the amount of delay, and if the count value of the amount of delay is the target value for the UDP/IP header data, encapsulates the register value of frame register unit 50 and outputs the result. UDP/IP application unit 31 encapsulates and outputs the register value corresponding to the IP packet header when the count value corresponds to the IP packet header, and encapsulates and outputs the register value corresponding to the UDP packet header when the count value corresponds to the UDP packet header.

Received information application unit 32 inserts the received information into the information (for example, the IP packet) output from UDP/IP application unit 31. Received information application unit 32 includes delay unit 32a, register unit 32b, selection unit 32c, and counting unit 32d.

Delay unit 32a performs delay for the insertion of the received information data relative to the data output from UDP/IP application unit 31. Delay unit 32a outputs the data resulting from the delay for the insertion of the received information to selection unit 32c.

Register unit 32b stores the received information output from demodulation unit 20. Register unit 32b may also store information (register values) about the received information output from frame register unit 50.

Selection unit 32c is connected between delay unit 32a/ register unit 32b and CRC information application unit 33, and selectively switches connection between delay unit 32a and register unit 32b to encapsulate the received information in the data and output the result. Selection unit 32c switches the connection from delay unit 32a to register unit 32b if the amount of delay counted by counting unit 32d is the target value for the insertion of the received information, and encapsulates the received information by applying the received information to the data.

Counting unit 32d counts the amount of delay (for example, the delay time) applied by delay unit 32a.

CRC information application unit 33 calculates the CRC for the data encapsulated by UDP/IP application unit 31 and received information application unit 32, encapsulates the CRC information indicating the calculated CRC in the data, and outputs the result. Stated differently, CRC information application unit 33 calculates the CRC including the received information.

Preamble application unit 34 inserts preamble data into the data output from CRC information application unit 33 (the data to which CRC information has been applied). Preamble application unit 34 performs delay for the insertion of the preamble data relative to the input data, counts the amount of delay, and if the count value of the amount of delay is the target value for the preamble data, encapsulates the preamble data stored in advance in the data output from CRC information application unit 33 and outputs the result.

Framing unit 30 may further include an element (not illustrated in the drawings) for applying start frame delimiter (SFD) information. The Preamble and the SFD information are synchronization information used in the transmission and reception of Ethernet (registered trademark; hereinafter the same) communication.

As a result, the input TLV packet is ETHER framed, and a signal in ETHER frame format is output from framing unit 30. The configuration of framing unit 30 is not limited to the configuration illustrated in FIG. 2. For example, received information application unit 32 may be located at an earlier stage than UDP/IP application unit 31, and preamble application unit 34 may be located at an earlier stage than CRC information application unit 33. Stated differently, framing unit 30 may be configured to encapsulate UDP/IP header data after encapsulating the received information in the TLV packet, and may be configured to encapsulate the CRC information after encapsulating the preamble data in the data to which the received information is applied.

Figure 3A:
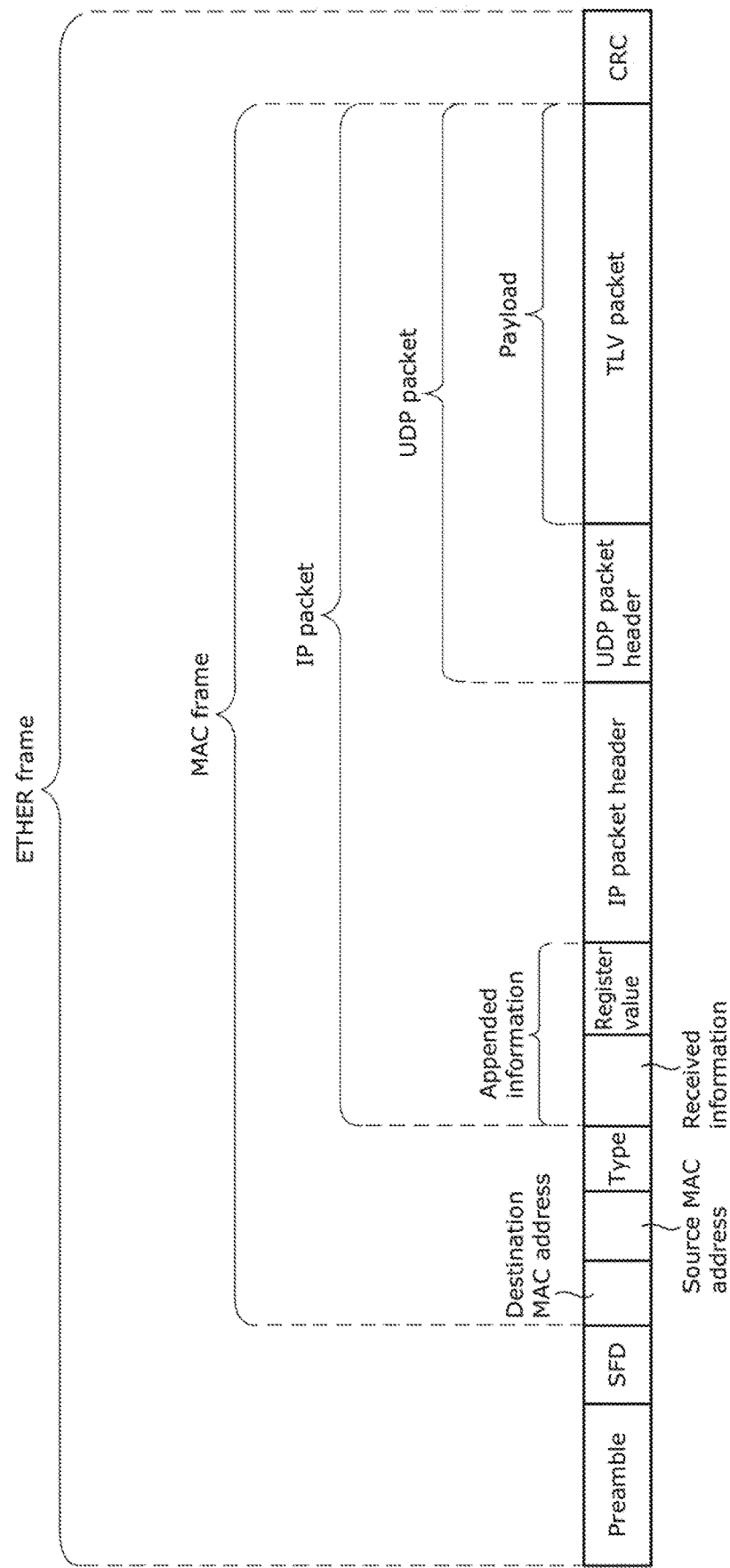
FIG. 3A illustrates a first example of a structure of an ETHER frame generated by a reception module according to Embodiment 1.
Figure 3B:
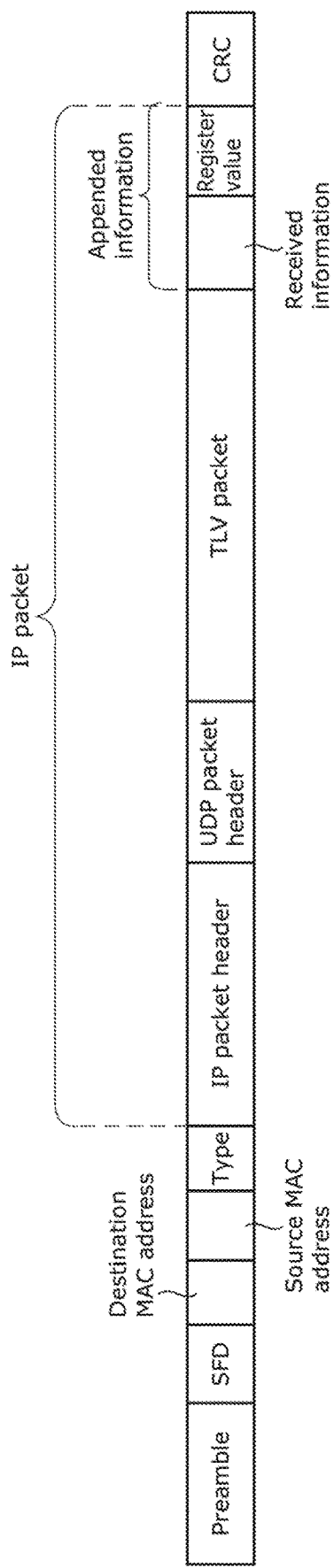
FIG. 3B illustrates a second example of a structure of an ETHER frame generated by the reception module according to Embodiment 1.

Next, the structure of the ETHER frame will be explained with reference to FIG. 3A and FIG. 3B. FIG. 3A illustrates a first example of a structure of an ETHER frame generated by reception module 10 according to the present embodiment. FIG. 3B illustrates a second example of a structure of an ETHER frame generated by reception module 10 according to the present embodiment.

As illustrated in FIG. 3A and FIG. 3B, framing unit 30 generates an ETHER frame in compliance with, for example, the frame structure of IEEE 802.3ab (1000BASE-T Gigabit Ethernet (GBE)), by inserting a TLV packet data format (for example, a single TLV format) in the MAC frame, appending preamble and SFD information as synchronization signals for transmission and reception in Ethernet communication, appending CRC information to check whether the frame received by reception module 10 is error-free, and further appending the received information and the register value. The received information and the register value are examples of the appended information. Note that it is sufficient if the appended information includes at least the received information.

The TLV packet is stored in the payload of the ETHER frame. The UDP packet header and the payload are stored in the UDP packet. In addition to the IP packet header and the UDP packet, the received information and the register value (the appended information) are stored in the IP packet. In other words, the TLV packet and the appended information are stored in the IP packet.

The destination MAC address, the source MAC address, the type, and the IP packet are stored in the MAC frame. The preamble, the SFD information, and the MAC frame are stored in the ETHER frame.

As illustrated in FIG. 3A, in an ETHER frame, the appended information may be arranged at the beginning of the IP packet. The appended information may, for example, be arranged in front of the IP packet header. This allows decoder 70 to select the data handling based on the appended information before reading the IP packet header. For example, if the received information includes signal quality information and the signal quality is poor, decoder 70 can discard the frame data after the IP packet header to reduce the processing load.

As illustrated in FIG. 3B, in an ETHER frame, the appended information may be arranged at the end of the IP packet. The appended information may, for example, be arranged after the TLV packet. As a result, the frame structure from the preamble to the TLV packet in the ETHER frame conforms to the IEEE 802.3ab frame structure, and changes to the frame structure can be minimized. Stated differently, in decoder 70, conventional decoding can be performed from the preamble to the TLV packet.

The order of the received information and register value in the appended information is not particularly limited. Moreover, the position of insertion of the appended information is not limited to the positions illustrated in FIG. 3A and FIG. 3B, and can be set arbitrarily. The position of insertion of the appended information may be after the SFD information (for example, between the SFD information and the destination MAC address), after the source MAC address (for example, between the source MAC address and the type), or some other position. If the IP packet header or the UDP packet header is not used, the appended information may be arranged in the position of the IP packet header or the UDP packet header. The received information and register value are not limited to being arranged next to each other. In addition to or instead of the received information and register value, any signal in reception module 10 may be inserted into the ETHER frame as the appended information, in the same manner as the appended information. Furthermore, header information indicating the number of transmission bits of the appended information may be inserted into the ETHER frame.

Referring again to FIG. 1, reception register unit 40 is a storage device for storing the received information obtained by demodulation unit 20. Reception register unit 40 stores each of the various types of information included in the received information.

Frame register unit 50 is a storage device that stores register values to be inserted into ETHER frames. The register values are used, for example, in various processes for TLV packets in decoder 70. The register values include, for example, the destination MAC address, the source MAC address, the IP packet header, the UDP packet header, and so on. The register values may also include information about the received information.

PHY unit 60 is an interface for network communication and includes, for example, a PHY chip. PHY unit 60 performs predetermined signal processing (for example, modulation) on the ETHER frame including the TLV packet (video signal) from reception module 10, and outputs the result to decoder 70.

Decoder 70 obtains, in advance, the format of the ETHER frame appended with the appended information, and performs various processing on the TLV packet in the obtained ETHER frame. The various processing may be, for example, processing for separating luminance (Y) signals and color difference (C) signals from the TLV packet, or other various video-related processing. The various processing may be performed using hardware or software. Decoder 70 is one example of the later-stage device of reception module 10.

In the present embodiment, decoder 70 is connected to reception register unit 40 and frame register unit 50 by I²C communication, and transmits and receives various data.

Each of input terminal 81 and output terminals 91 and 92 is a group of one or more terminals, and includes, for example, one or more terminal pins.

As described above, reception module 10 according to the present embodiment generates an ETHER frame in which the received information and the register value are inserted, and outputs the ETHER frame toward decoder 70.

1-2. Reception Module Operation

Figure 4:
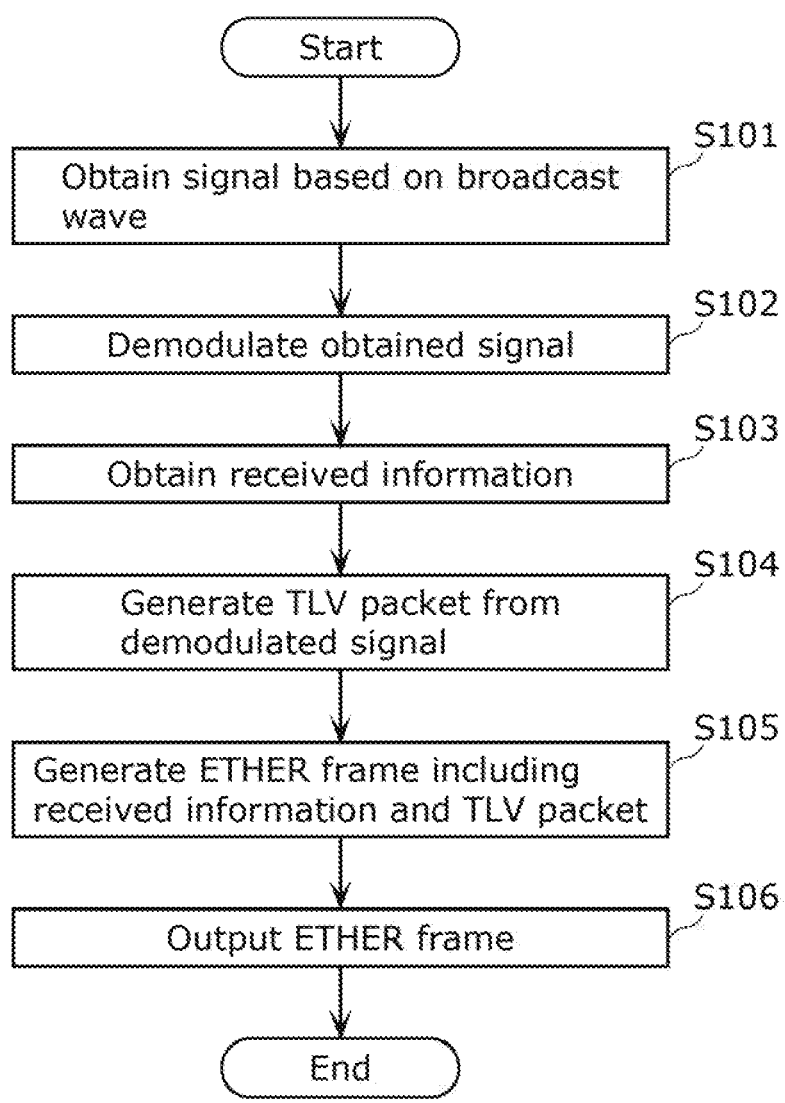
FIG. 4 is a flowchart illustrating an operation performed by the reception module according to Embodiment 1.

Next, a reception operation performed by reception module 10 described above will be described with reference to FIG. 4. FIG. 4 is a flowchart illustrating an operation performed by reception module 10 according to the present embodiment.

As illustrated in FIG. 4, core unit 21 of demodulation unit 20 obtains, via input terminal 81, a signal based on a broadcast wave received by the antenna (S101). A signal based on a broadcast wave is a digital broadcast signal, and is, for example, a baseband signal or an IF signal.

Next, core unit 21 demodulates the obtained signal (S102). Stated differently, core unit 21 demodulates a digital broadcast signal (a first digital broadcast signal) that is based on the received digital broadcast wave. Step S102 is one example of the step of demodulating a first digital broadcast signal.

Core unit 21 obtains the received information based on the demodulated signal (S103). Core unit 21 may, for example, obtain the received information by determining the signal quality or by calculating the error ratio before error correction. The received information is, for example, information obtained in the step of demodulating a first digital broadcast signal.

Next, packet generation unit 22 generates a TLV packet from the signal (the digital broadcast signal) demodulated by core unit 21 (S104). Packet generation unit 22 may generate the TLV packet by extracting the TLV packet from the demodulated and corrected digital broadcast signal. Step S104 is one example of the step of generating a first packet. The TLV packet is one example of the first packet that includes content information.

Demodulation unit 20 outputs the received information to framing unit 30 and reception register unit 40. For example, demodulation unit 20 outputs at least one of the various information included in the received information to framing unit 30, and outputs each of the various information included in the received information to reception register unit 40.

Next, framing unit 30 generates an ETHER frame that includes the received information (or the appended information) and the TLV packet (S105). For example, framing unit 30 generates an ETHER frame including the appended information and the TLV packet. For example, the appended information includes the received information that is obtained in step S103 and is information other than the content information. Framing unit 30 can be said to generate an ETHER frame inserted with the received information (or the appended information) and the TLV packet. For example, framing unit 30 generates the ETHER frame illustrated in FIG. 3A or FIG. 3B. The ETHER frame generated in step S105 is one example of the first transmission frame. Step S105 is one example of the step of generating a first transmission frame.

The step of generating a first transmission frame may include a step of calculating a CRC for the IP packet and appending CRC information to the IP packet. In the present embodiment, appended information is also used in the CRC calculation.

Next, framing unit 30 outputs the generated ETHER frame to PHY unit 60 via output terminal 91 (S106). As a result, the ETHER frame is input into decoder 70 via PHY unit 60. Accordingly, it can be said that framing unit 30 outputs the generated ETHER frame toward decoder 70.

1-3. Advantageous Effects, Etc.

Figure 5:
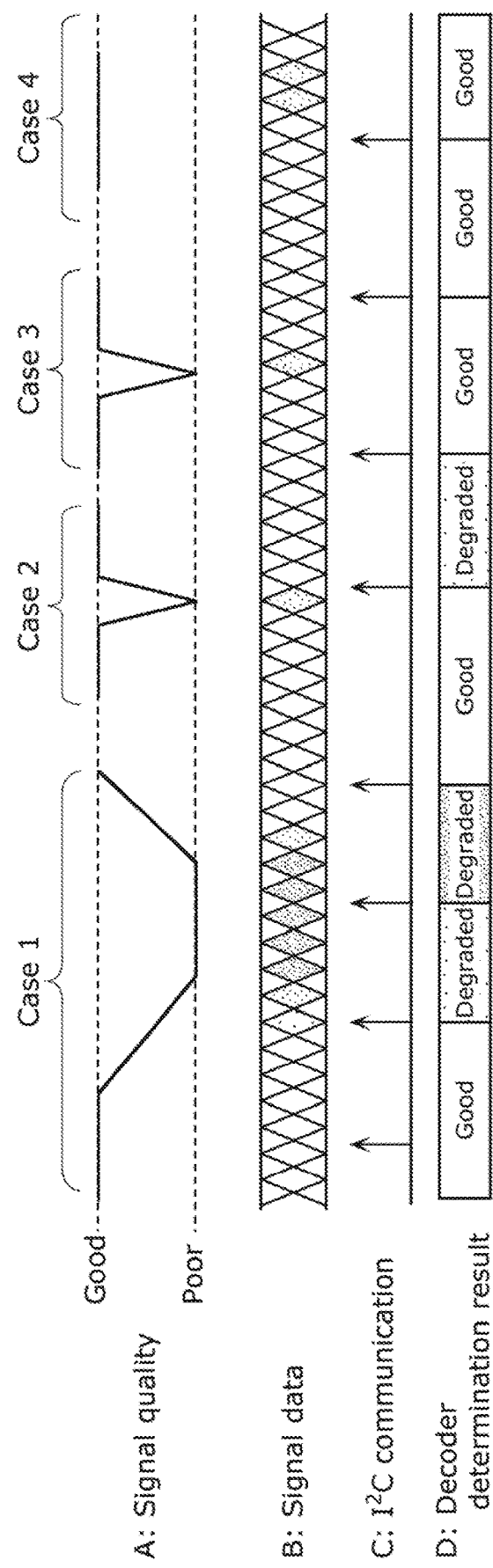
FIG. 5 is a diagram for illustrating an advantageous effect achieved by the reception module according to Embodiment 1.

Next, the advantageous effect of inserting the received information into the ETHER frame and outputting the result will be described with reference to FIG. 5. FIG. 5 is a diagram for illustrating the advantageous effect achieved by reception module 10 according to the present embodiment.

FIG. 5 illustrates the transitions over time in "A: Signal quality", "B: Signal data", "C: I²C communication", and "D: Decoder determination result". "A: Signal quality" indicates the quality of the received digital broadcast wave. "B: Signal data" indicates the quality of the signal data (the ETHER frame) output from output terminal 91. "C: I²C communication" indicates the timing of the I²C communication between decoder 70 and reception module 10. The arrows indicate the timings of the communication between decoder 70 and reception module 10. "D: Decoder determination result" indicates the result of the determination of the signal quality based on the received information obtained by decoder 70 via the I²C communication. Note that darker shading indicates worse signal quality in "B: Signal data" and "D: Decoder determination result".

In Case 1, the decoder determination result (for example, good or degraded) is correctly determined since the signal data degrades as signal quality decreases and I²C communication is performed at timings when signal quality transitions. Case 2 illustrates a case in which signal quality changes in a shorter period of time than in Case 1, but since I²C communication is performed at a timing when signal quality transitions, the decoder determination result is correctly determined just like in Case 1. However, although the determination result should show that the signal quality improved immediately, the determination result indicates that the signal quality is degraded for longer than it actually is.

In Case 3, the timing at which the signal quality degrades and the timing at which I²C communication takes place are misaligned, and accurate signal quality data cannot be obtained through I²C communication. Although the signal data has degraded, decoder 70 is not able to obtain real-time signal quality information because the speed of the I²C communication cannot keep up, which may result in an inconsistency between the signal data and the decoder determination result. Stated differently, even though the signal data has degraded, decoder 70 may falsely determine that the signal data is good.

Note that since I²C communication uses a party line configuration and a plurality of devices are connected to the I²C bus, there is a transfer wait time until the bus is open. In other words, there is a constraint on the timing at which decoder 70 obtains the received information from reception register unit 40 via I²C communication. Moreover, even if the bus is obtained, a slave address or individual specification of an address is required before data can be read, whereby further time is required before the desired information can be obtained. Stated differently, in I²C communication, it is difficult to ensure real-time obtainment of the received information.

When reception module 10 includes a plurality of demodulation units 20, a diversity reception configuration or a system configuration such as multiple-input and multiple-output (MIMO) is conceivable. In this case, since there is information to be read out for each demodulation unit 20, the overall amount of information to be read out increases, which slows down the readout cycle of the desired information, making it necessary to select the readout values to suit the bus.

It is also possible to read out an interrupt signal using output terminal 92, but in order to increase the amount of information to be read out, it is necessary to increase the number of terminals of reception module 10 and decoder 70. As the number of terminals increase, issues arise such as reception module 10 and decoder 70 becoming larger in size or the routing of signal wiring for the substrate or the like becoming more complicated. A condition for the generation of an interrupt is, for example, when an event occurs in demodulation unit 20 (for example, when synchronization information is established, or when error correction of a digital broadcast signal is completed). In this case, the operation is performed to obtain, via reception register unit 40, details regarding the received information of demodulation unit 20 using I²C communication.

In Case 4, despite the good signal quality, signal data degradation occurs. This can occur when there is a problem on the signal data transmission path. This also creates an inconsistency between the signal data and the decoder determination result. In decoder 70, as in Case 3, although the degradation of the signal quality is overlooked due to an issue with communication speed, it is not possible to isolate the cause of the signal quality degradation, i.e., determine whether the degradation is caused by degradation of the transmission line or poor signal quality. Here, if the signal quality and the signal data are synchronized in real time, it is possible to determine which one is causing the problem.

Conventionally, in order to obtain received information, which is information other than video and audio content information, decoder 70 obtains received information stored in reception register unit 40 of reception module 10 by I²C communication or inputs, to decoder 70, an interrupt signal of the received information output using output terminal 92. Unfortunately, as explained in FIG. 5, a problem with this method is that it is difficult to obtain accurate data on signal quality or difficult to isolate the cause of signal quality degradation.

In the present embodiment, since the received information and the register value are inserted into the ETHER frame (the signal data), the real-time nature of the ETHER frame, the received information, and register value can be ensured. Since the TLV signal (TLV packet), the received information, and the register value are framed and output at the same timing per packet, the real-time nature of the information obtainment in decoder 70 can be ensured. Moreover, by including desired received information in the ETHER frame, it is possible to, for example, omit the reading of the interrupt signal using output terminal 92. In this case, output terminal 92 may be omitted, leading to a reduction in the number of parts used and thus a reduction in the size of reception module 10.

Variation of Embodiment 1

Figure 6:
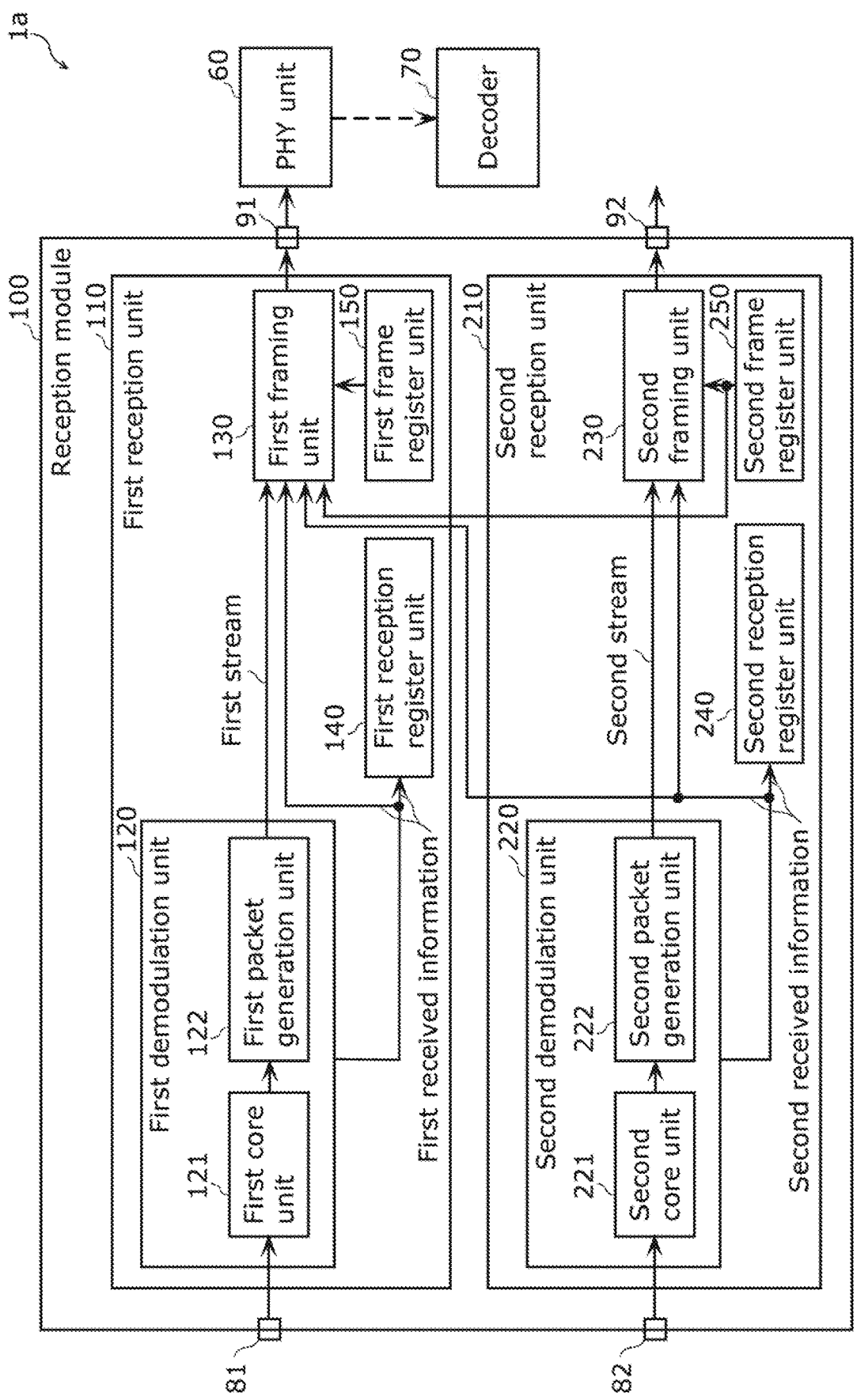
FIG. 6 is a block diagram illustrating a functional configuration of a reception system according to a variation of Embodiment 1.

Next, a reception system according to the present variation will be described with reference to FIG. 6 through FIG. 8. First, the configuration of the reception system according to the present variation will be described with reference to FIG. 6. FIG. 6 is a block diagram illustrating the functional configuration of reception system 1a according to the present variation. Reception module 100 of reception system 1a according to the present variation differs from reception module 10 according to Embodiment 1 mainly in that it includes a plurality of demodulation units (two in the example illustrated in FIG. 6). Hereinafter, the configuration of reception module 100 according to the present variation will be described with focus on the differences from reception module 10 according to Embodiment 1.

For example, a plurality of channels may be received for simultaneous viewing or simultaneous recording of a plurality of programs. In order to receive a plurality of channels, each of the outputs of the plurality of tuners is demodulated and content streams (TLV packets) of the respective channels are output to decoder 70. Hereinafter, as one example of a plurality of channels, the configuration of a reception module for receiving two channels is described.

As illustrated in FIG. 6, reception system 1a according to the present variation includes reception module 100, PHY unit 60, and decoder 70. Since the configurations of PHY unit 60 and decoder 70 are the same as that of PHY unit 60 and decoder 70 according to Embodiment 1, repeated description will be omitted. Although FIG. 6 illustrates a single PHY unit 60/decoder 70 pair that is connected to output terminal 91, another PHY unit 60/decoder 70 pair may be connected to output terminal 92.

Reception module 100 includes first reception unit 110 and second reception unit 210. Baseband signals obtained via mutually different tuners, for example, are input to first reception unit 110 and second reception unit 210.

First reception unit 110 includes first demodulation unit 120, first framing unit 130, first reception register unit 140, and first frame register unit 150. First demodulation unit 120 (first core unit 121 and first packet generation unit 122), first reception register unit 140, and first frame register unit 150 may have the same configuration as demodulation unit 20 (core unit 21 and packet generation unit 22), reception register unit 40, and frame register unit 50 according to Embodiment 1, respectively, and as such, repeated description thereof will be omitted.

First framing unit 130 obtains second received information from second demodulation unit 220 of second reception unit 210, and generates an ETHER frame in which the second received information in addition to first received information is inserted. FIG. 7 illustrates one example of a structure of an ETHER frame generated by reception module 100 according to the present variation. More specifically, FIG. 7 illustrates one example of a structure of an ETHER frame generated by first framing unit 130.

Figure 7:
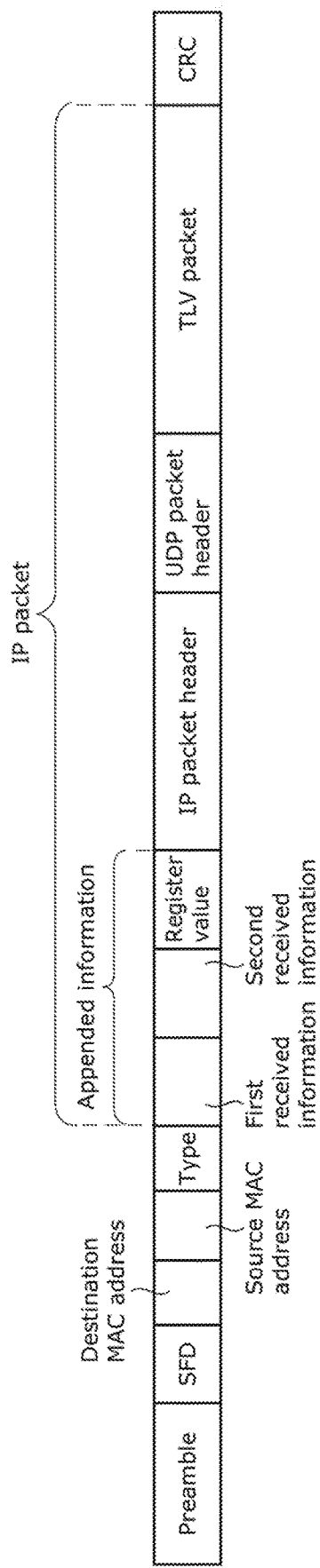
FIG. 7 illustrates one example of a structure of an ETHER frame generated by a reception module according to the variation of Embodiment 1.

As illustrated in FIG. 7, one characterizing feature of the ETHER frame generated by first framing unit 130 is the inclusion of second received information in the appended information. The ETHER frame includes, as appended information, first received information from first demodulation unit 120, second received information from second demodulation unit 220, a register value from first frame register unit 150, and a register value from second frame register unit 250. For example, the appended information is stored in the IP packet. In the ETHER frame, the appended information may be arranged at the beginning of the IP packet or at the end of the IP packet. The order of the first received information, the second received information, and the register values in the appended information is not particularly limited. Decoder 70 obtains and stores in advance the positions of insertion of the first received information, the second received information, and the register values in the ETHER frame.

The first received information and the second received information may include the same information. For example, the first received information and the second received information may each include a signal quality and an error ratio before error correction. The first received information and the second received information may include different information.

Referring again to FIG. 6, second reception unit 210 generates an ETHER frame in which the second received information obtained by second demodulation unit section 220 and the register value of second frame register unit 250 are inserted based on a signal (a baseband signal or IF signal) from the tuner, and outputs the ETHER frame via output terminal 92. For example, second reception unit 210 outputs the ETHER frame to another decoder 70 (not illustrated in the drawings). Second reception unit 210 includes second demodulation unit 220, second framing unit 230, second reception register unit 240, and second frame register unit 250. Second demodulation unit 220 (second core unit 221 and second packet generation unit 222), second framing unit 230, second reception register unit 240, and second frame register unit 250 may have the same configuration as demodulation unit 20 (core unit 21 and packet generation unit 22), framing unit 30, reception register unit 40, and frame register unit 50 according to Embodiment 1, respectively, and as such, repeated description thereof will be omitted. Second demodulation unit 220 outputs the second received information to first framing unit 130 in addition to second framing unit 230 and second reception register unit 240.

The second received information output to second framing unit 230 includes at least one of a signal quality, an error ratio before error correction, demodulation synchronization information, a TMCC signal, interference signal detection information, or an emergency warning broadcast signal. The second received information output to second framing unit 230 may include, for example, at least one of a signal quality or an error ratio before error correction.

Although FIG. 6 illustrates an example in which first framing unit 130 obtains the first received information and the second received information, this example is non-limiting. For example, additionally, second framing unit 230 may also obtain the first received information and the second received information. In other words, both first framing unit 130 and second framing unit 230 may obtain the first received information and the second received information.

Next, a reception operation performed by reception module 100 described above will be described with reference to FIG. 8. FIG. 8 is a sequence diagram of operations performed by elements included in reception module 100 according to the present variation.

Figure 8:
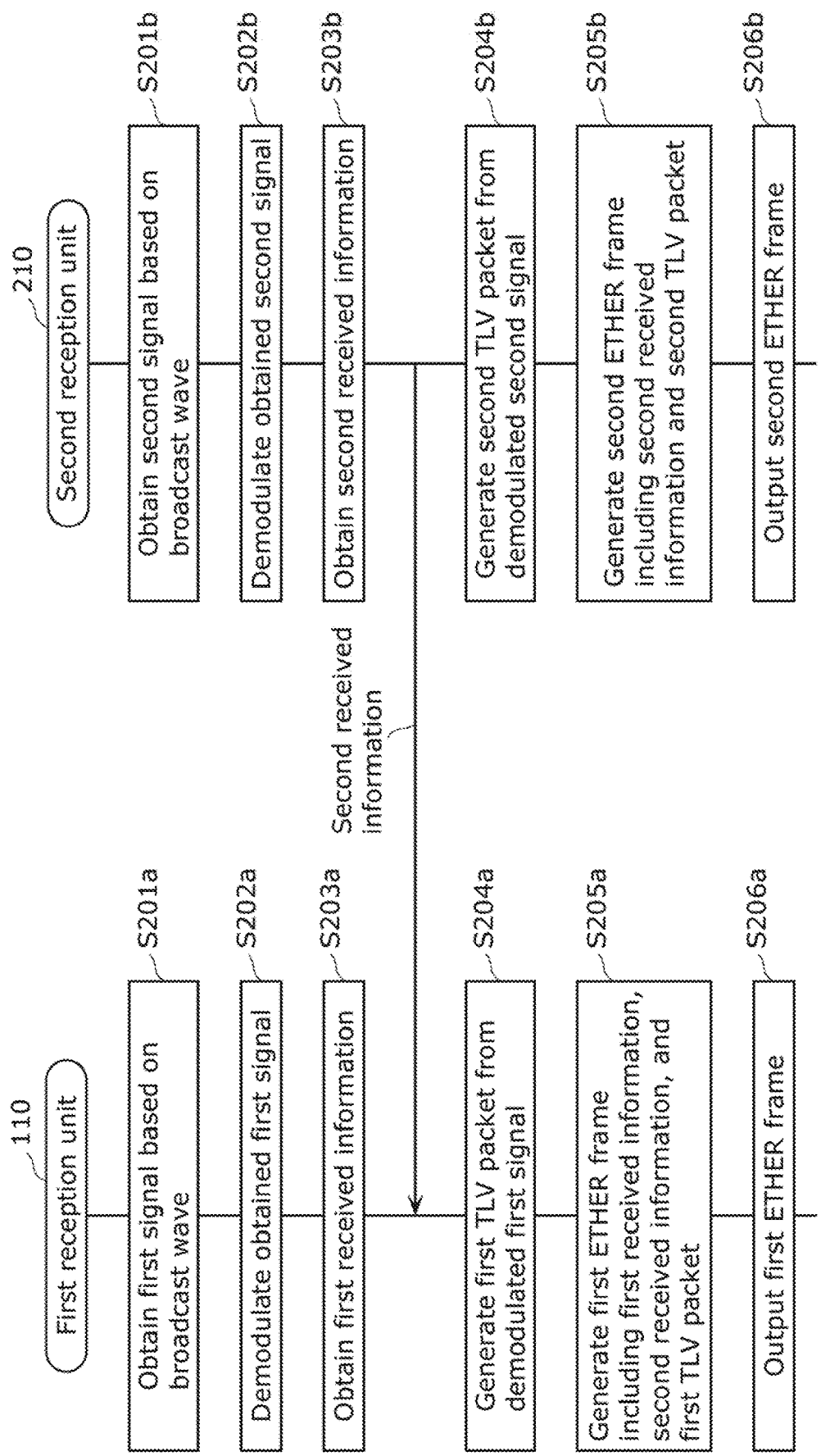
FIG. 8 is a sequence diagram of operations performed by elements included in the reception module according to the variation of Embodiment 1.

As illustrated in FIG. 8, first core unit 121 of first demodulation unit 120 of first reception unit 110 obtains a first signal based on a broadcast wave via input terminal 81 (S201a). A first signal based on a broadcast wave is one example of the first digital broadcast signal, and is, for example, a baseband signal or an IF signal.

Next, first core unit 121 demodulates the obtained first signal (S202a). First core unit 121 obtains first received information based on the demodulated signal (S203a).

Second core unit 221 of second demodulation unit section 220 of second reception unit 210 obtains a second signal based on a broadcast wave via input terminal 82 (S201b). The second signal based on the broadcast wave is a different signal from the first signal. The second signal is, for example, a baseband signal or an IF signal.

Next, second core unit 221 demodulates the obtained second signal (S202b). Stated differently, second core unit 221 demodulates a digital broadcast signal (a second digital broadcast signal) that is based on the received digital broadcast wave. Step S202b is one example of the step of demodulating a second digital broadcast signal.

Second core unit 221 obtains second received information based on the demodulated signal (S203b). Second core unit 221 may, for example, obtain the second received information by determining the signal quality or by calculating the error ratio before error correction. The second received information is information obtained based on the second signal that is different from the first signal, and is information other than video and audio content information.

Second demodulation unit 220 outputs the obtained second received information to second framing unit 230, second reception register unit 240, and first reception unit 110. Second demodulation unit 220 outputs at least one of the various information included in the second received information to second framing unit 230 and first reception unit 110, and outputs each of the various information included in the second received information to second reception register unit 240. The second received information output to second framing unit 230 and the second received information output to first reception unit 110 may include the same information and, alternatively, may include different information.

Next, second packet generation unit 222 generates a second TLV packet (second stream) from the signal demodulated by second core unit 221 (S204b). Stated differently, second packet generation unit 222 generates a second TLV packet including the content information obtained in step S202b. Step S204b is one example of the step of generating a second packet, and the second TLV packet is one example of the second packet.

Next, second framing unit 230 generates a second ETHER frame including the second received information and the second TLV packet (S205b). Second framing unit 230 can be said to generate a second ETHER frame in which the second received information and the second TLV packet are inserted. Second framing unit 230 generates an ETHER frame, for example, as illustrated in FIG. 3A. Stated differently, the second ETHER frame does not include the first received information obtained by first demodulation unit 120.

Next, second framing unit 230 outputs the generated second ETHER frame via output terminal 92 (S206b). Second framing unit 230 may, for example, output the generated second ETHER frame toward a decoder (not illustrated in the drawings).

Next, first reception unit 110 obtains the second received information from second reception unit 210.

Next, first packet generation unit 122 generates a first TLV packet (first stream) from the signal demodulated by first core unit 121 (S204a).

First demodulation unit 120 outputs first received information to first framing unit 130 and first reception register unit 140. First demodulation unit 120 outputs at least one of the various information included in the first received information to first framing unit 130, and outputs each of the various information included in the first received information to first reception register unit 140.

Next, first framing unit 130 generates a first ETHER frame including the first received information, the first TLV packet, and the second received information (S205a). First framing unit 130 can be said to generate a first ETHER frame in which the first received information, the first TLV packet, and the second received information are inserted. For example, first framing unit 130 generates the ETHER frame illustrated in FIG. 7.

As illustrated in FIG. 3A and FIG. 7, the first ETHER frame and the second ETHER frame differ from each other in regard to the configuration of the appended information.

Next, first framing unit 130 outputs the generated first ETHER frame to PHY unit 60 via output terminal 91 (S206a). First framing unit 130 can be said to output the generated first ETHER frame toward decoder 70.

Decoder 70 connected to output terminal 91 is preconfigured to receive an ETHER frame having, for example, the frame structure illustrated in FIG. 7 and to process the received ETHER frame, and the decoder (not illustrated in the drawings) connected to output terminal 92 is preconfigured to receive an ETHER frame having, for example, the frame structure illustrated in FIG. 3A and to process the received ETHER frame.

In this way, by including the second received information in the first ETHER frame, decoder 70 can obtain information such as the reception status of the broadcast wave corresponding to the video of a channel that is not being displayed via a display unit or the like. Decoder 70 can, for example, suggest to the user to switch to a video of a channel with better reception. For example, in a vehicle or the like where the reception statuses of the respective broadcast waves corresponding to the channels tend to change over time, decoder 70 can recommend a channel with good reception at that point in time to, for example, a passenger. Reception module 100 may be provided in a moving body such as a vehicle, for example.

Embodiment 2

2-1. Reception System Configuration

Figure 9:
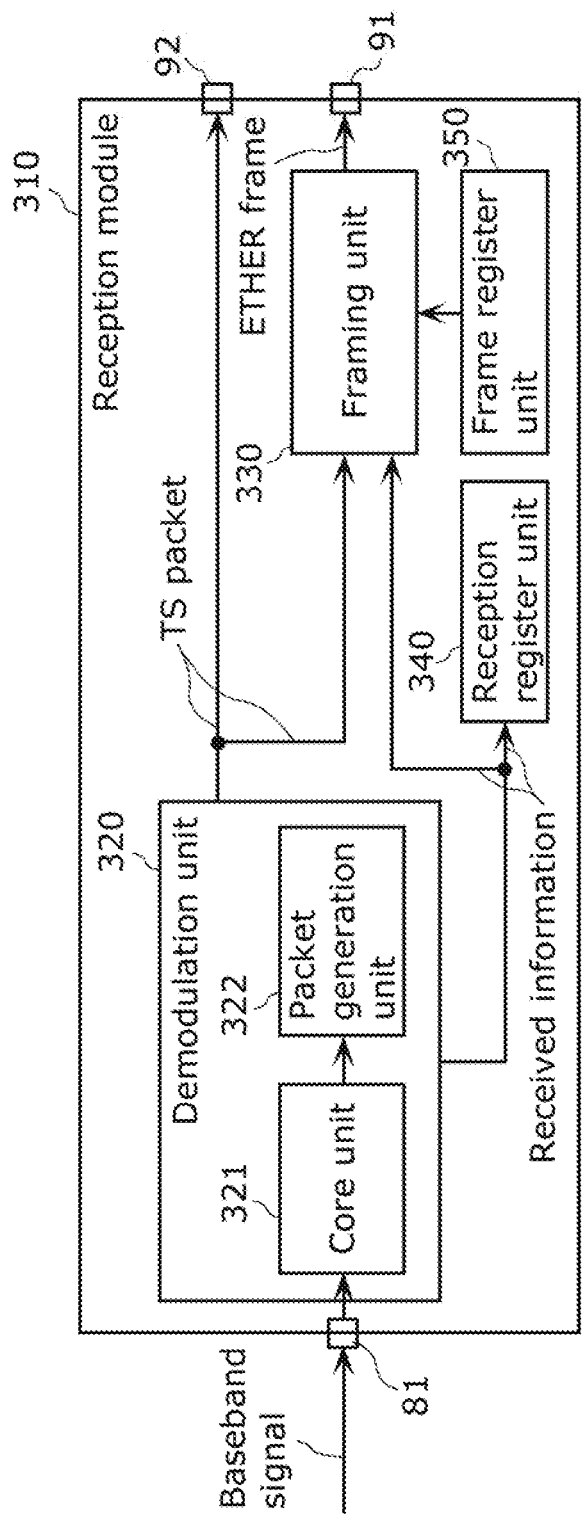
FIG. 9 is a block diagram illustrating the functional configuration of a reception module according to Embodiment 2.

First, a configuration of the reception system according to the present embodiment will be described with reference to FIG. 9 through FIG. 10D. FIG. 9 is a block diagram illustrating the functional configuration of reception module 310 according to the present embodiment. Reception module 310 according to the present embodiment differs from reception module 10 according to Embodiment 1 mainly in that it generates an ETHER frame including a TS packet. Hereinafter, the configuration of reception module 310 according to the present embodiment will be described with focus on the differences from reception module 10 according to Embodiment 1. In Embodiment 2 and later, unless noted otherwise, only the reception module in the reception system is illustrated in the drawings.

The broadcast wave in the present embodiment is, for example, a digital terrestrial television broadcast wave or a 2K satellite broadcast wave. Digital terrestrial television broadcasting or 2K satellite broadcasting is performed using conventional fixed-length packets (for example, transport stream (TS) packets). The reception system including reception module 310 according to the present embodiment receives broadcast waves such as integrated services digital broadcasting-terrestrial (ISDB-T) broadcast waves.

In the connection between reception module 310 and decoder 70 in such a reception system, reception module 310 can be connected to decoder 70 that can be connected in TS packet format, but cannot be connected to decoder 70 that takes other frame formats, such as ETHER frame format, as input.

In view of this, the present embodiment describes reception module 310 that can be connected to decoder 70 regardless of whether decoder 70 can be connected in TS packet format or in ETHER frame format.

As illustrated in FIG. 9, reception module 310 includes demodulation unit 320, framing unit 330, reception register unit 340, and frame register unit 350.

Demodulation unit 320 obtains a baseband signal or an IF signal based on a broadcast wave such as ISDB-T that is input to input terminal 81, generates a predetermined packet based on the obtained signal, and outputs the result. In the present embodiment, demodulation unit 320 generates a TS packet. Demodulation unit 320 includes core unit 321 and packet generation unit 322.

Core unit 321 converts the baseband signal input to input terminal 81 from an analog signal to a digital signal and demodulates the analog-to-digital converted baseband signal. Core unit 321 may further perform error correction processing.

Packet generation unit 322 generates a TS packet based on the demodulated baseband signal. Packet generation unit 322 generates and outputs a TS packet in which the output rate is adjusted based on the error-corrected signal and the parallel or serial output format is selected. A TS packet is, for example, data in TS packet format, and is one example of the first packet.

Demodulation unit 320 obtains received information other than the video and audio content information based on the demodulated baseband signal. The received information other than the video and audio content information is information not included in the TS packet. The received information includes, for example, information obtained in the demodulation performed by core unit 321. The received information includes at least one of a signal quality, an error ratio before error correction, demodulation synchronization information, a TMCC signal, interference signal detection information, or an emergency warning broadcast signal. The received information may include, for example, at least one of a signal quality or an error ratio before error correction.

Figure 10A:
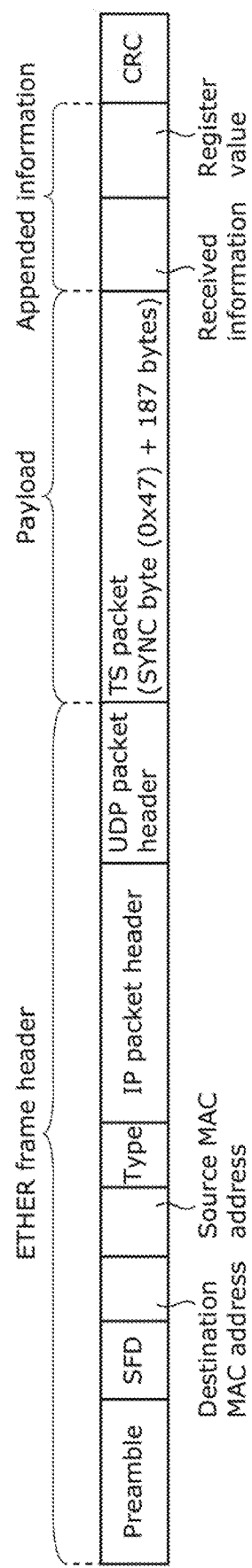
FIG. 10A illustrates a first example of a structure of an ETHER frame generated by the reception module according to Embodiment 2.

Framing unit 330 generates an ETHER frame, which is one example of the transmission frame to be transmitted to decoder 70, based on the received information and the TS packet. Framing unit 330 generates an ETHER frame including the received information, the TS packet, and various information generated according to the settings of frame register unit 350 and required for the ETHER frame. FIG. 10A illustrates a first example of a structure of an ETHER frame generated by reception module 310 according to the present embodiment.

As illustrated in FIG. 10A, the TS packet is stored in the payload of the ETHER frame. Stated differently, framing unit 330 can be said to generate an ETHER frame by inserting a TS packet into the payload. A TS packet has a fixed-length of 188 bytes, for example. More specifically, a TS packet consists of a SYNC (synchronization) byte (0x47), which indicates that it is the beginning of a frame, and 187 other bytes. The TS packet may consist of only 187 bytes without the SYNC. Just like in Embodiment 1, an IP packet may also include received information and a register value (appended information). An IP packet includes a TS packet and appended information. The length of the appended information may be the same as the length of the TS packet, for example. The length of the appended information may be 188 bytes, for example.

Figure 10B:
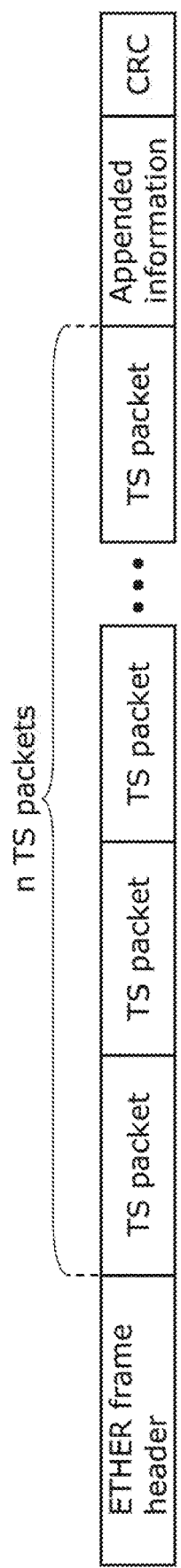
FIG. 10B illustrates a second example of a structure of an ETHER frame generated by the reception module according to Embodiment 2.
Figure 10C:
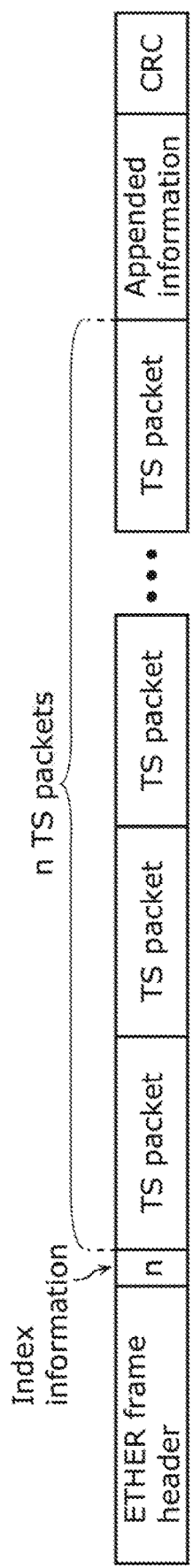
FIG. 10C illustrates a third example of a structure of an ETHER frame generated by the reception module according to Embodiment 2.

The structure of the ETHER frame generated by framing unit 330 is not limited to the structure illustrated in FIG. 10A. FIG. 10B illustrates a second example of a structure of an ETHER frame generated by reception module 310 according to the present embodiment. FIG. 10C illustrates a third example of a structure of an ETHER frame generated by reception module 310 according to the present embodiment. FIG. 10D illustrates a fourth example of a structure of an ETHER frame generated by reception module 310 according to the present embodiment.

As illustrated in FIG. 10B, a plurality of TS packets may be stored in the payload of the ETHER frame. For example, the number of TS packets to be stored in the payload may be set in advance. This reduces overhead and enables efficient data transmission.

As illustrated in FIG. 10C, the IP packet of the ETHER frame may include information (index information) about the number of TS packets included in the ETHER frame. This makes it possible to transmit an arbitrary number of TS packets according to the situation, on a per-frame basis, for example.

As illustrated in FIG. 10D, the ETHER frame may also include appended information for each TS packet.

The order of the TS packets and appended information illustrated in FIG. 10A through FIG. 10D is non-limiting. For example, in FIG. 10D, the TS packets and the appended information may be arranged alternately. The number of TS packets and appended information contained in one ETHER frame may be the same and, alternatively, may be different. So long as they are set in advance, the order and number of TS packets and appended information are not limited to any particular order and number.

In reception module 310 according to the present embodiment, it is not essential that demodulation unit 320 outputs the received information to framing unit 330. Stated differently, the ETHER frame generated by framing unit 330 need not include any appended information.

The ETHER frames illustrated in FIG. 10B through FIG. 10D may be generated, for example, by reception module 310 including a plurality of demodulation units 320, or based on baseband signals obtained in a time series.

Referring again to FIG. 9, framing unit 330 is capable of outputting the ETHER frame format via output terminal 91. Demodulation unit 320 can output the TS packets as-is via output terminal 92.

This enables decoder 70 to be connected to reception module 310 regardless of whether decoder 70 supports the TS transmission format or the ETHER transmission format. Stated differently, flexibility regarding the connectability between reception module 310 and decoder 70 can be improved.

Note that decoder 70 performs, for example, decoding such as MPEG2 decoding.

2-2. Reception System Operation

Figure 11:
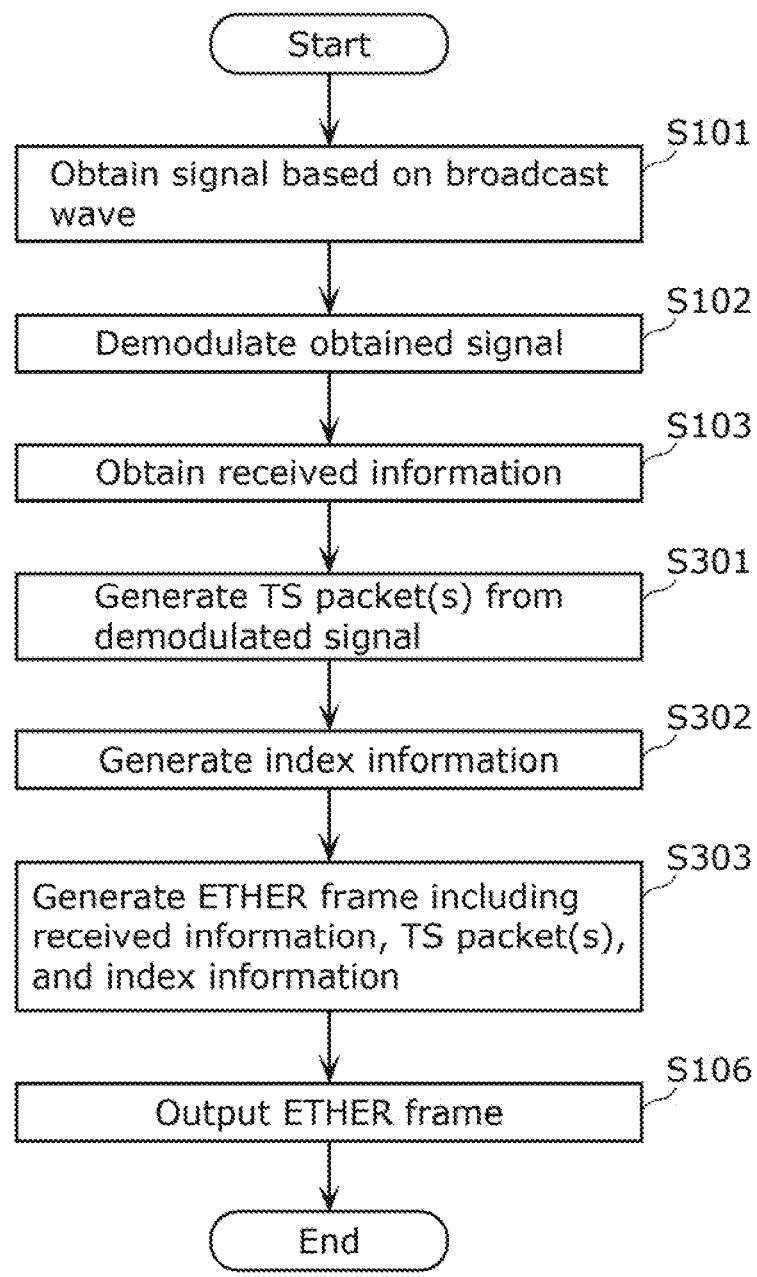
FIG. 11 is a flowchart illustrating an operation performed by the reception module according to Embodiment 2.

Next, a reception operation performed by reception module 310 described above will be described with reference to FIG. 11. FIG. 11 is a flowchart illustrating an operation performed by reception module 310 according to the present embodiment. FIG. 11 illustrates an operation for generating and outputting the ETHER frame illustrated in FIG. 10C. As the processing of steps S102, S103, and S106 is the same as the processing of steps S102, S103, and S106 illustrated in FIG. 4, repeated description will be omitted.

As illustrated in FIG. 11, core unit 321 of demodulation unit 320 obtains, via input terminal 81, a signal based on a broadcast wave such as an ISDB-T broadcast wave (S101).

Next, packet generation unit 322 generates a TS packet from a signal demodulated by core unit 321 (S301). For example, packet generation unit 322 generates a plurality of TS packets based on a plurality of baseband signals obtained in a time series.

Demodulation unit 320 outputs the received information to framing unit 330 and reception register unit 340. For example, demodulation unit 320 outputs at least one of the various information included in the received information to framing unit 330, and outputs each of the various information included in the received information to reception register unit 340.

Next, framing unit 330 obtains a plurality of TS packets in a time series from demodulation unit 320 and generates index information indicating the number of TS packets obtained (S302).

Next, framing unit 330 generates an ETHER frame including the received information, the plurality of TS packets, and the index information (S303). Framing unit 330 can be said to generate an ETHER frame in which the received information, the plurality of TS packets, and the index information are inserted. For example, framing unit 330 generates the ETHER frame illustrated in FIG. 10C.

In this way, in the present embodiment, a first packet including a plurality of TS packets is generated in step S301, and a first transmission frame further including information indicating the number of the plurality of TS packets is generated in step S303.

If the number of TS packets included in the ETHER frame is set in advance, the process of step S302 need not be performed.

Variation 1 of Embodiment 2

Figure 12:
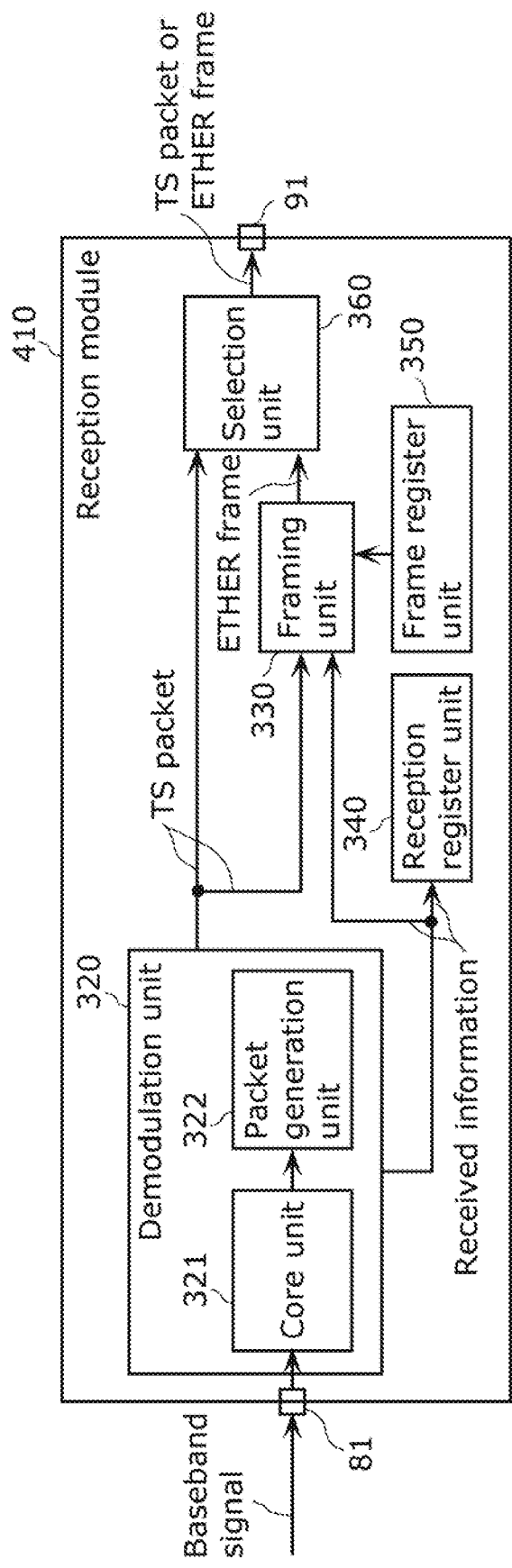
FIG. 12 is a block diagram illustrating a functional configuration of a reception module according to Variation 1 of Embodiment 2.

The configuration of the reception system according to the present variation will be described with reference to FIG. 12. FIG. 12 is a block diagram illustrating the functional configuration of reception module 410 according to the present variation. Reception module 410 according to the present variation differs from reception module 310 according to Embodiment 2 mainly in that it includes selection unit 360. Hereinafter, the configuration of reception module 410 according to the present variation will be described with focus on the differences from reception module 310 according to Embodiment 2.

As illustrated in FIG. 12, reception module 410 includes, in addition to reception module 310 according to Embodiment 2, selection unit 360 connected between demodulation unit 320 and framing unit 330 on one side and output terminal 91 on the other. Reception module 410 also includes a single output terminal 91.

Selection unit 360 receives inputs of data in TS packet format, which is the output of packet generation unit 322, and data in ETHER frame format, which is the output of framing unit 330, and selects the data in the desired format and outputs it from output terminal 91. For example, selection unit 360 selects the desired data format in accordance with a setting from a component external to reception module 410. For example, selection unit 360 may select the desired data format in accordance with a setting from decoder 70 connected to reception module 410.

Selection unit 360 is connected between packet generation unit 322 and framing unit 330 on one side and output terminal 91 on the other. Selection unit 360 is connected downstream of, i.e., at a later stage than packet generation unit 322 and framing unit 330.

Selection unit 360 may include, for example, a switching element and a control unit that controls the switching element. The switching element is controlled to switch between connecting framing unit 330 and output terminal 91 and connecting packet generation unit 322 and output terminal 91.

This makes it possible to reduce the number of terminals of reception module 410 because a common output terminal 91 can be shared.

The frame generation method according to the present variation may further include a step of selectively outputting an ETHER frame including a TS packet or a TS packet.

Variation 2 of Embodiment 2

Figure 13:
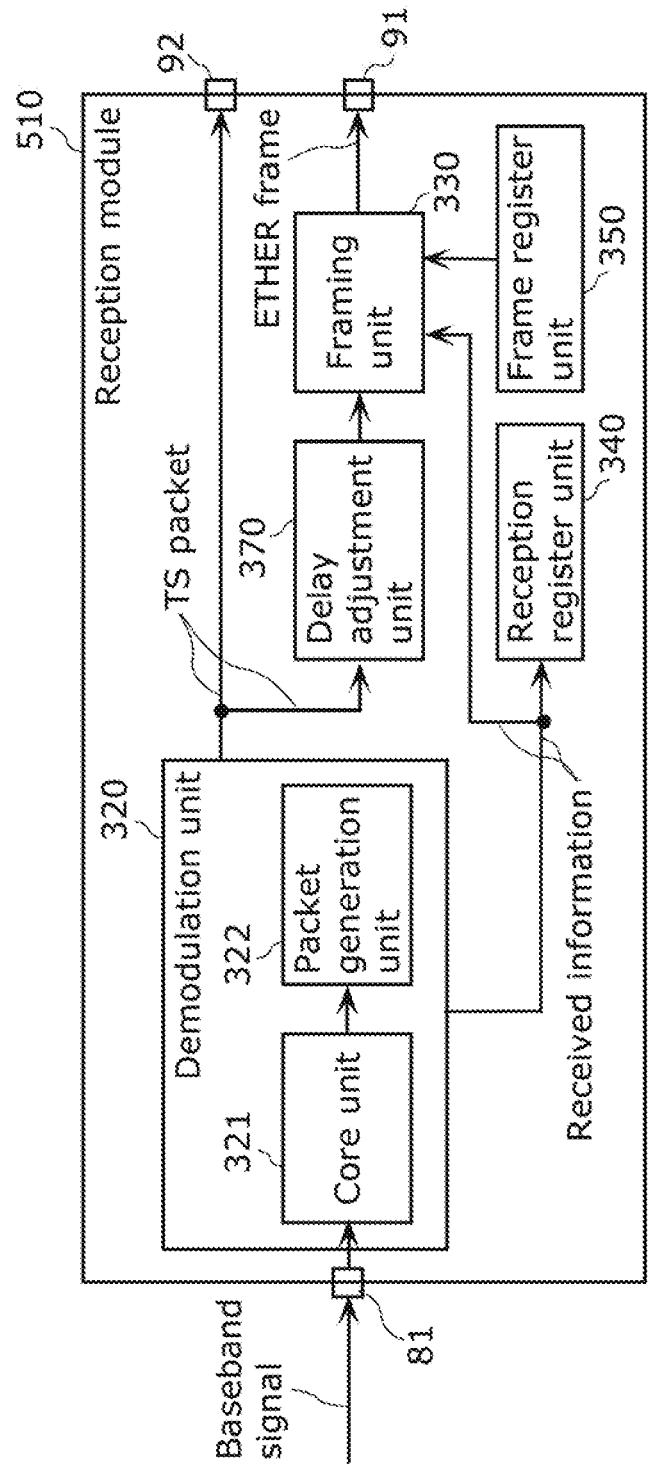
FIG. 13 is a block diagram illustrating a functional configuration of a reception module according to Variation 2 of Embodiment 2.

The configuration of the reception system according to the present variation will be described with reference to FIG. 13. FIG. 13 is a block diagram illustrating the functional configuration of reception module 510 according to the present variation. Reception module 510 according to the present variation differs from reception module 310 according to Embodiment 2 mainly in that it includes delay adjustment unit 370. Hereinafter, the configuration of reception module 510 according to the present variation will be described with focus on the differences from reception module 310 according to Embodiment 2.

As illustrated in FIG. 13, reception module 510 includes, in addition to reception module 310 according to Embodiment 2, delay adjustment unit 370 connected between demodulation unit 320 and framing unit 330. Delay adjustment unit 370 can be said to be provided at an earlier stage than framing unit 330.

Delay adjustment unit 370 delays a TS packet generated by packet generation unit 322 to match the output rate of the ETHER frame, and outputs delayed TS packet to framing unit 330. For example, when generating an ETHER frame including a plurality of TS packets, delay adjustment unit 370 delays the TS packets and outputs the delayed TS packets to framing unit 330. Delay adjustment unit 370 can be said to concatenate a plurality of TS packets and output them to framing unit 330.

As a result, since reception module 510 includes delay adjustment unit 370, an ETHER frame including the plurality of TS packets illustrated in FIG. 10B through FIG. 10D can be easily generated by simply adjusting the amount of delay of delay adjustment unit 370.

Reception module 510 may further include selection unit 360 according to Variation 1 of Embodiment 2.

The frame generation method according to the present variation may include a step of delaying a TS packet.

Embodiment 3

3-1. Reception System Configuration

Figure 14:
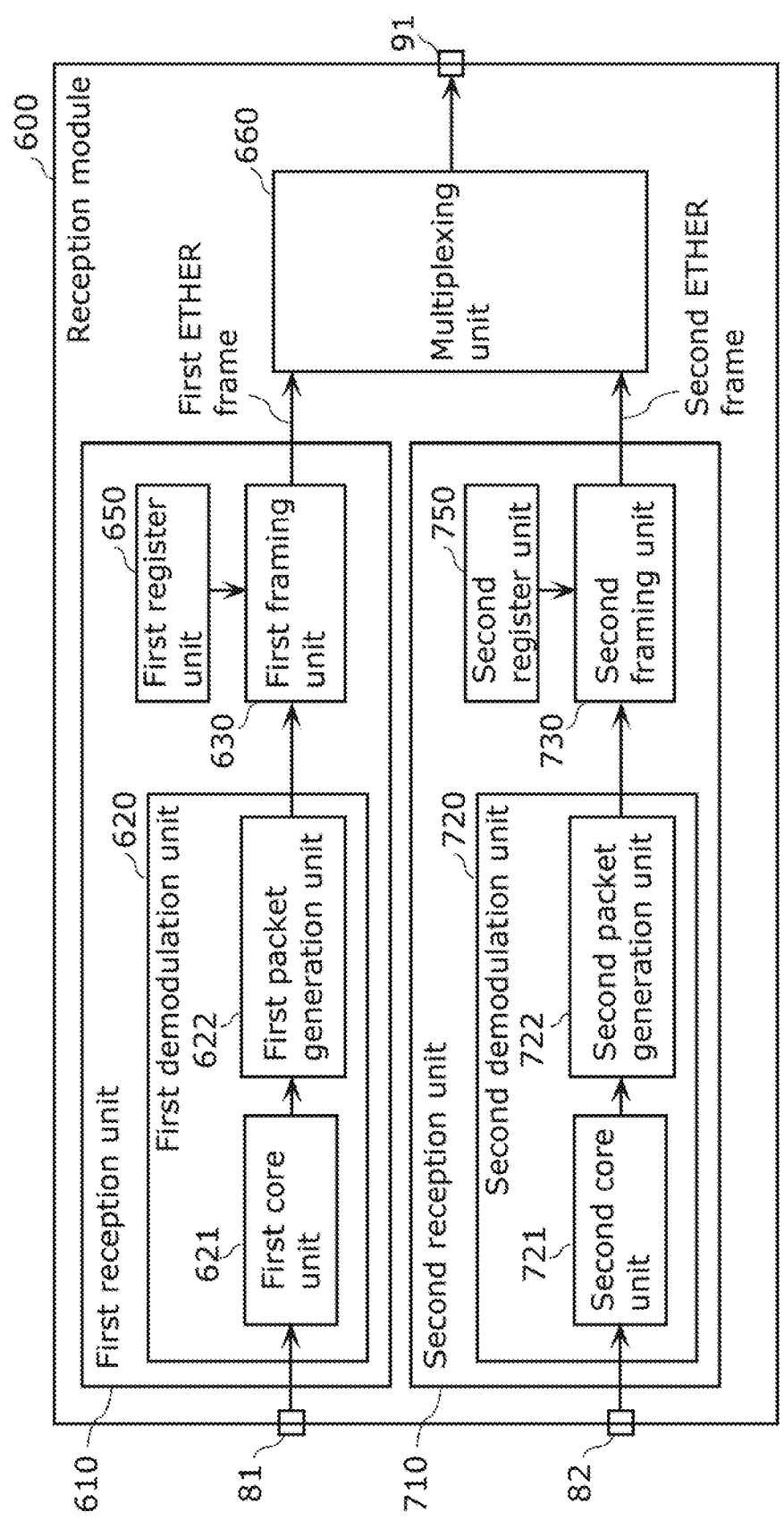
FIG. 14 is a block diagram illustrating a functional configuration of a reception module according to Embodiment 3.

First, a configuration of the reception system according to the present embodiment will be described with reference to FIG. 14 through FIG. 16. FIG. 14 is a block diagram illustrating the functional configuration of reception module 600 according to the present embodiment. Reception module 600 according to the present embodiment differs from reception module 10 according to Embodiment 1 mainly in that it is configured to be capable of receiving a plurality of channels and includes multiplexing unit 660 at an earlier stage than output terminal 91. Hereinafter, the configuration of reception module 600 according to the present embodiment will be described with focus on the differences from reception module 10 according to Embodiment 1.

The present embodiment pertains to, for example, advanced BS broadcasting (4K/8K broadcasting). The TLV format is adopted in advanced BS broadcasting, and the content stream is stored in TLV packets. Note that the broadcasting is not limited to advanced BS broadcasting; the broadcasting may be broadcasting in which the TS format is adopted, such as digital terrestrial television broadcasting or 2K satellite broadcasting.

As illustrated in FIG. 14, reception module 600 includes first reception unit 610 and second reception unit 710. For example, mutually different baseband signals are input to first reception unit 610 and second reception unit 710.

First reception unit 610 includes first demodulation unit 620, first framing unit 630, and first register unit 650. First reception unit 610 may further include a reception register unit that stores received information obtained by first demodulation unit 620. First reception unit 610 may be configured such that first demodulation unit 620 is capable of outputting the received information to first framing unit 630.

First demodulation unit 620 (first core unit 621 and first packet generation unit 622) and first register unit 650 may have same configuration as demodulation unit 20 (core unit 21 and packet generation unit 22) and frame register unit 50 according to Embodiment 1, respectively, and as such, repeated description thereof will be omitted. First framing unit 630 generates a first ETHER frame that includes a first TLV packet in the payload and differs from the second ETHER frame generated by second framing unit 730 in regard to least one of the destination IP address setting in the IP packet header (i.e., the destination IP address value) or the destination port setting in the UDP packet header (i.e., the destination port value). First framing unit 630 may generate a first ETHER frame that further includes appended information in the IP packet.

The destination IP address value and the destination port value included in the first ETHER frame are examples of the first output destination information. The first output destination information is not limited to the destination IP address value and the destination port value; the first output destination information may be any information in the first ETHER frame which can specify that the frame is an ETHER frame generated by first reception unit 610.

Second demodulation unit 720 (second core unit 721 and second packet generation unit 722) and second register unit 750 may have the same configuration as first demodulation unit 620 (first core unit 621 and first packet generation unit 622) of first reception unit 610 and first register unit 650, respectively, and as such, repeated description thereof will be omitted. Second framing unit 730 includes a second TLV packet in the payload that is different than the first TLV packet, and generates a second ETHER frame that differs from the first ETHER frame generated by first framing unit 630 in regard to at least one of the destination IP address value in the IP packet header or the destination port value in the UDP packet header. Second framing unit 730 may generate a second ETHER frame that further includes appended information in the IP packet.

The destination IP address value and the destination port value included in the second ETHER frame are examples of the second output destination information. The second output destination information is not limited to the destination IP address value and the destination port value; the second output destination information may be any information in the second ETHER frame which can specify that the frame is an ETHER frame generated by second reception unit 710.

Multiplexing unit 660 performs time division multiplexing on the first ETHER frame (the first ETHER frame signal) output from first framing unit 630 and the second ETHER frame (the second ETHER frame signal) output from second framing unit 730. The method of adjusting the time division multiplexing in multiplexing unit 660 is not particularly limited. The method of adjusting the time division multiplexing may be, for example, to preferentially output the ETHER frame that is input first chronologically, or to always preferentially output one of first ETHER frame and second ETHER frame regardless of whether the other of the first ETHER frame and the second ETHER frame is present or not. In this way, multiplexing unit 660 sequentially outputs a plurality of ETHER frames including the first ETHER frame and the second ETHER frame from output terminal 91 by performing time division multiplexing. The adjustment method may be set in advance and stored in the storage unit of (not illustrated in the drawings) of reception module 600.

Next, the ETHER frames generated by multiplexing unit 660 will be described with reference to FIG. 15 and FIG. 16. FIG. 15 illustrates a first example of structures of ETHER frames generated by reception module 600 according to the present embodiment. FIG. 16 illustrates a second example of structures of ETHER frames generated by reception module 600 according to the present embodiment. More specifically, FIG. 15 and FIG. 16 illustrate structures of the first ETHER frame and the second ETHER frame that are time division multiplexed by multiplexing unit 660. FIG. 16 illustrates structures of the first ETHER frame and the second ETHER frame that further include appended information in the IP packets and are time division multiplexed by multiplexing unit 660.

Figure 15:
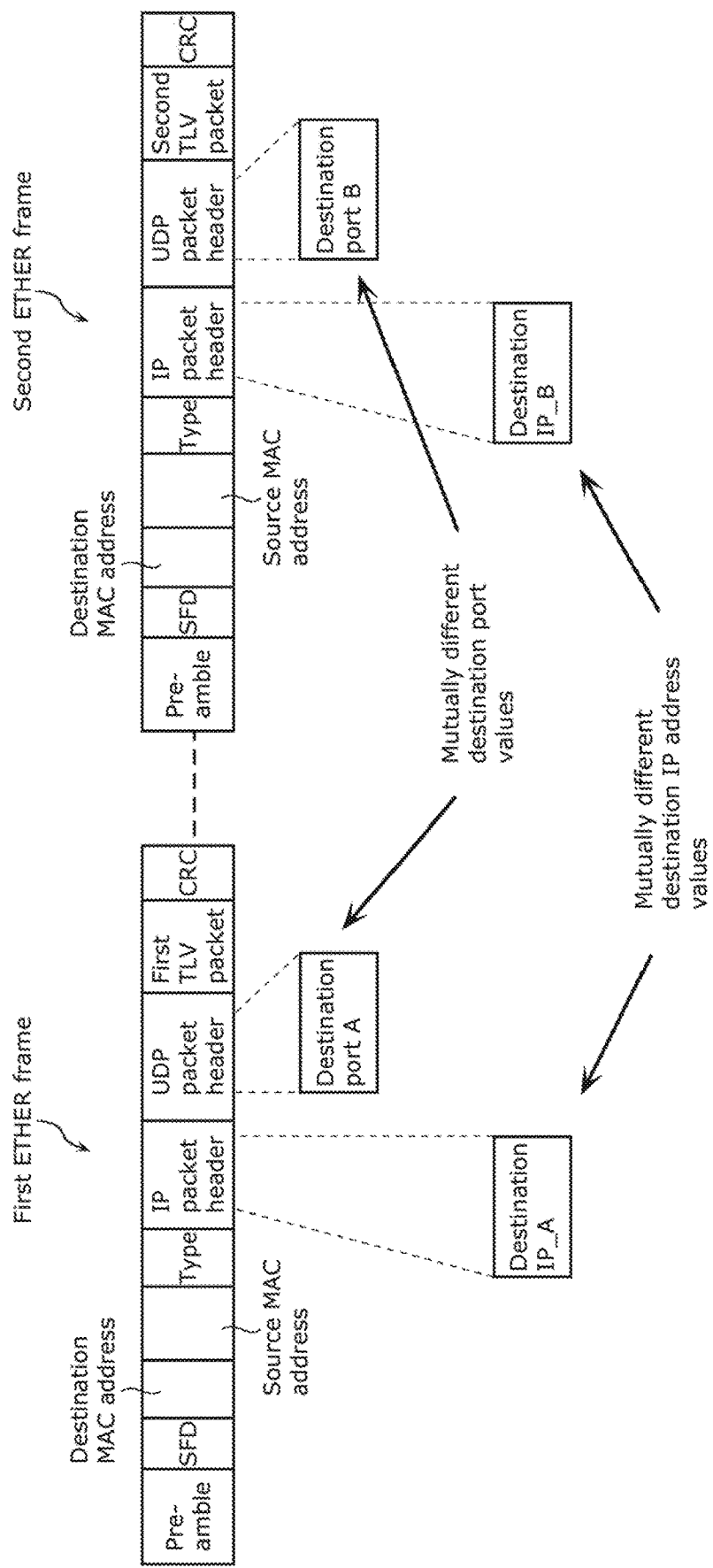
FIG. 15 illustrates a first example of a structure of an ETHER frame generated by the reception module according to Embodiment 3.

As illustrated in FIG. 15, the first ETHER frame and the second ETHER frame have mutually different destination IP address values and destination port values.

Figure 16:
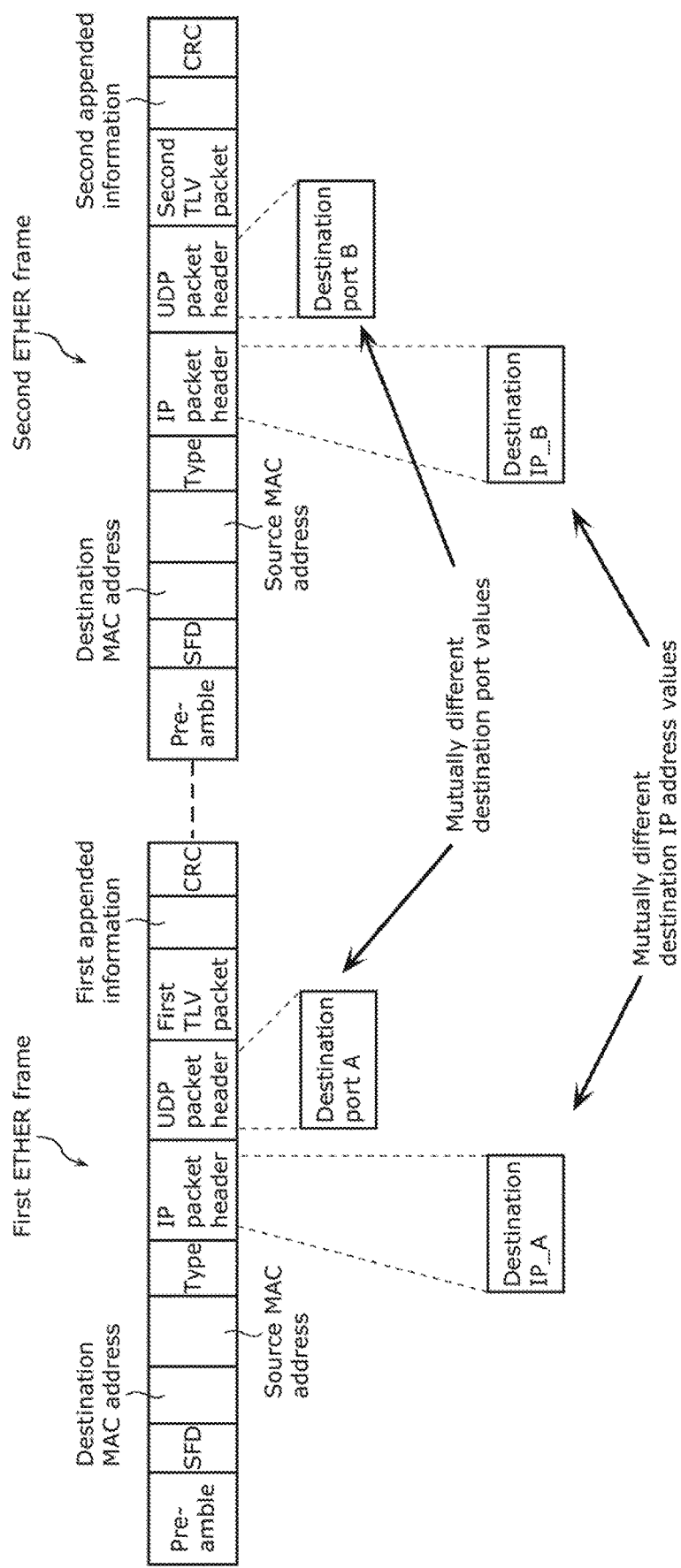
FIG. 16 illustrates a second example of a structure of an ETHER frame generated by the reception module according to Embodiment 3.

As illustrated in FIG. 16, the first ETHER frame, which further includes first appended information, and the second ETHER frame, which further includes second appended information, have mutually different destination IP address values and destination port values as well. The position of insertion of the first appended information and the second appended information may be any position in the ETHER frame as long as the position of insertion is the same for both of the first appended information and the second appended information.

This enables decoder 70 to separate the TLV data of the two channels by determining at least one of the destination IP address value in the IP packet header or the destination port value in the UDP packet header of the time division multiplexed ETHER frame. Stated differently, decoder 70 is capable of separating a first ETHER frame and a second ETHER frame from data output as a single ETHER frame. Therefore, even if a plurality of ETHER frames are output as a single stream by multiplexing unit 660, decoder 70 can perform the decoding corresponding to the ETHER frame for each ETHER frame.

By using multiplexing unit 660 to output a plurality of ETHER frames by time division multiplexing as described above, the number of output terminals 91 of reception module 600 can be reduced. Additionally, TLV packets of a plurality of channels can be transmitted to decoder 70 which includes only one ETHER frame input terminal. Furthermore, since the components required for connecting reception module 600 and decoder 70 can be reduced, cost can be reduced and the mounting surface area can be reduced. Such components include, for example, PHY devices (for example, PHY devices for ETHER), connectors (for example, RJ45 connectors), transformers, LAN cables, etc.

Reception module 600 is not limited to including two reception units, and may include three or more reception units as long as they fit within the transmission rate of the ETHER frame. Multiplexing unit 660 may then multiplex the ETHER frames output from the respective reception units.

3-2. Reception System Operation

Figure 17:
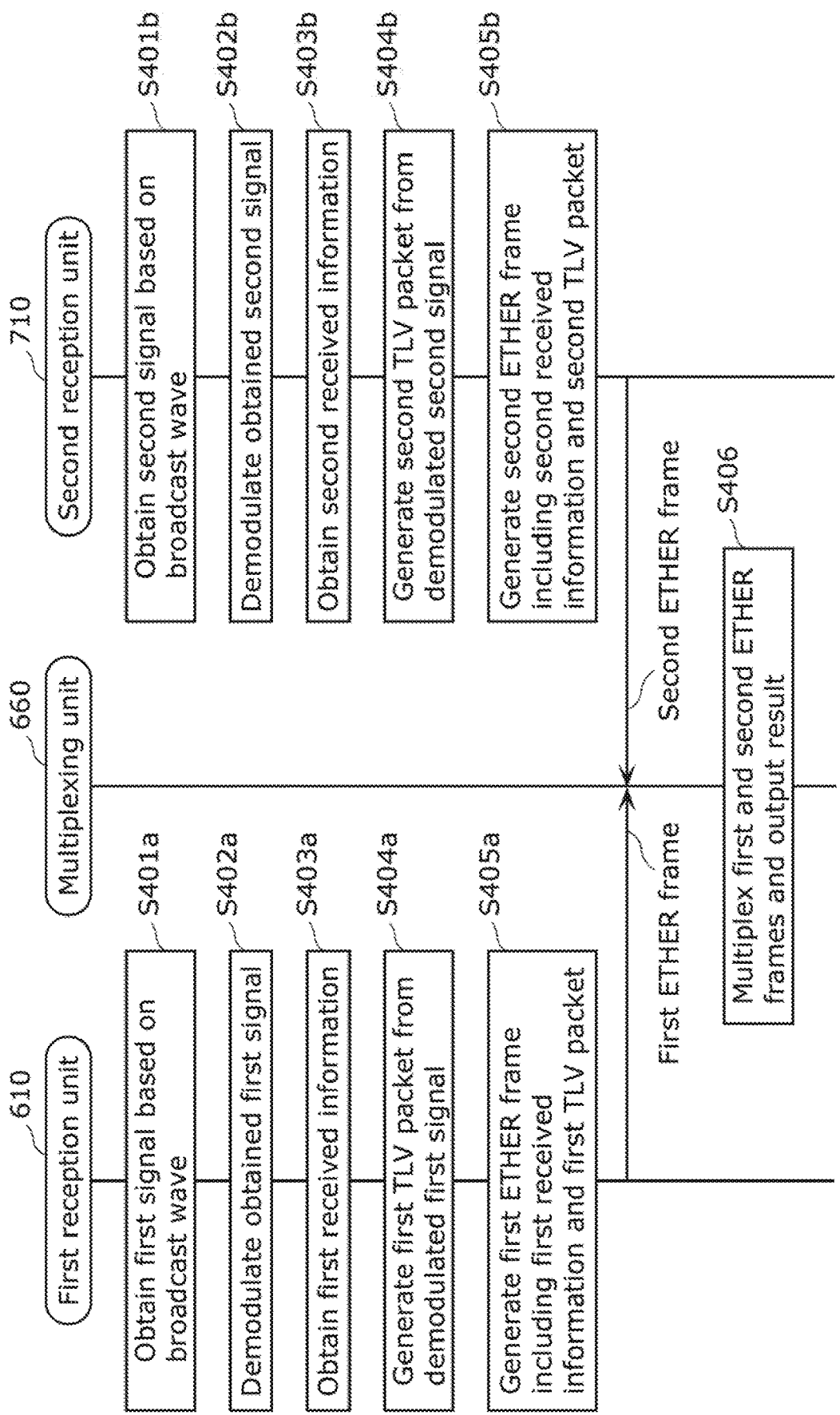
FIG. 17 is a sequence diagram of operations performed by elements included in the reception module according to Embodiment 3.

Next, a reception operation performed by reception module 600 described above will be described with reference to FIG. 17. FIG. 17 is a sequence diagram of operations performed by elements included in reception module 600 according to the present embodiment. FIG. 17 is a sequence diagram for when first framing unit 630 and second framing unit 730 each generate an ETHER frame including appended information. Steps S401*a* through S404*a* illustrated in FIG. 17 are the same as steps S201*a* to S204*a* illustrated in FIG. 8, respectively, and steps S401*b* to S404*b* illustrated in FIG. 17 are the same as steps S201*b* to S204*b* illustrated in FIG. 8, respectively, and as such, repeated description thereof will be omitted.

As illustrated in FIG. 17, first framing unit 630 of first reception unit 610 generates a first ETHER frame including the first received information and the first TLV packet (S405*a*). The first ETHER frame generated in step S405*a*, for example, has the same structure as the first ETHER frame illustrated in FIG. 16, and at least one of the destination IP address value in the IP packet header (the destination information) or the destination port value in the UDP packet header (the destination port information) is different from the second ETHER frame. First framing unit 630 outputs the generated first ETHER frame to multiplexing unit 660.

Step S405*a* is one example of the step of generating a first transmission frame. The at least one of the destination IP address value or the destination port value is one example of the first output destination information. Stated differently, in the step of generating a first transmission frame according to the present embodiment, a first ETHER frame including first output destination information about the output destination of the first TLV packet is generated.

Second framing unit 730 of second reception unit 710 generates a second ETHER frame including the second received information and the second TLV packet (S405*b*). For example, second framing unit 730 generates a second ETHER frame including appended information and the second TLV packet. The appended information includes the second received information obtained in step S403*b*, which is information other than the content information. Second framing unit 730 can be said to generate an ETHER frame in which the second received information (or appended information) and the second TLV packet are inserted. The second ETHER frame generated in step S405*b* is one example of the second transmission frame. Step S405*b* is one example of the step of generating a second transmission frame.

The second ETHER frame generated in step S405*b*, for example, has the same structure as the second ETHER frame illustrated in FIG. 16, and at least one of the destination IP address value in the IP packet header or the destination port value in the UDP packet header is different from the first ETHER frame generated in step S405*a*. Second framing unit 730 outputs the generated second ETHER frame to multiplexing unit 660.

The at least one of the destination IP address value or the destination port value is one example of the second output destination information. Stated differently, in the step of generating a second transmission frame according to the present embodiment, a second ETHER frame including second output destination information, which is about the output destination of the second TLV packet and is different than the first output destination information, is generated.

Next, multiplexing unit 660 multiplexes the first ETHER frame and the second ETHER frame based on an adjustment method that is set in advance and outputs the result to decoder 70 (S406). For example, multiplexing unit 660 performs time division multiplexing on the first ETHER frame and the second ETHER frame. Step S406 is one example of the step of multiplexing.

Variation 1 of Embodiment 3

Figure 18:
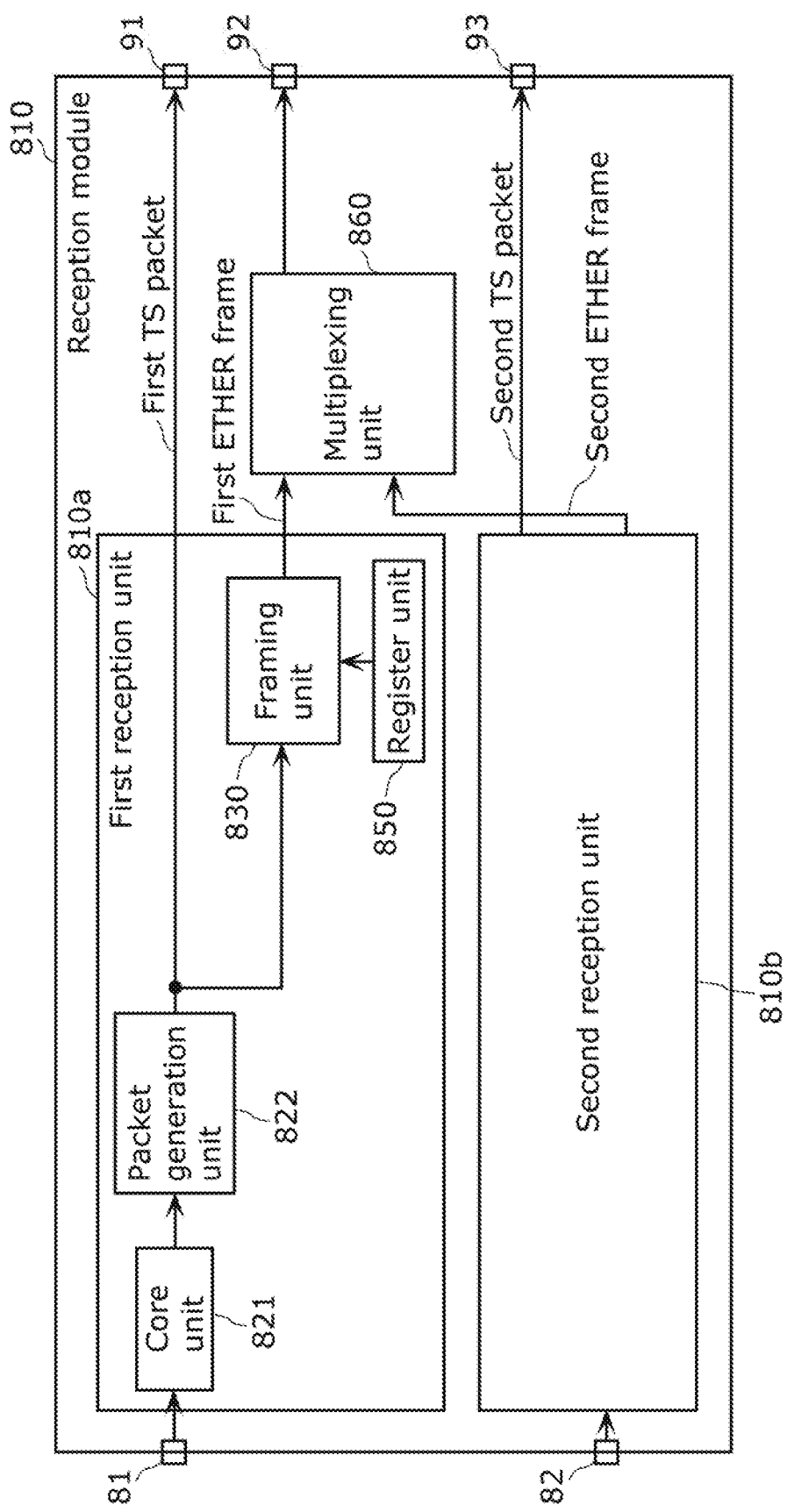
FIG. 18 is a block diagram illustrating a functional configuration of a reception module according to Variation 1 of Embodiment 3.

Next, a reception system according to the present variation will be described with reference to FIG. 18. First, the configuration of the reception system according to the present variation will be described with reference to FIG. 18. FIG. 18 is a block diagram illustrating the functional configuration of reception module 810 according to the present variation. Reception module 810 according to the present variation differs from reception module 600 according to Embodiment 3 mainly in that the two reception units output TS packets and ETHER frames resulting from ETHER framing the TS packets. Hereinafter, the configuration of reception module 810 according to the present variation will be described with focus on the differences from reception module 600 according to Embodiment 3.

As illustrated in FIG. 18, reception module 810 includes first reception unit 810*a*, second reception unit 810*b*, multiplexing unit 860, two input terminals 81 and 82, and three output terminals 91, 92, and 93. First reception unit 810*a* and second reception unit 810*b* may have the same configuration, and as such, only the configuration of first reception unit 810*a* will be described.

First reception unit 810*a* includes core unit 821, packet generation unit 822, framing unit 830, and register unit 850. Core unit 821, packet generation unit 822, and register unit 850 illustrated in FIG. 18 may have the same configuration as core unit 321, packet generation unit 322, and frame register unit 350 illustrated in FIG. 9, and as such, repeated description thereof will be omitted.

Framing unit 830 generates an ETHER frame including a TS packet in the payload. For example, framing unit 830 generates an ETHER frame by replacing the first TLV packet with a TS packet in the first ETHER frame illustrated in FIG. 15.

As a result, first reception unit 810a outputs a first TS packet and a first ETHER frame resulting from ETHER framing the first TS packet.

First reception unit 810a may further include a reception register unit that stores received information obtained by the demodulation unit including core unit 821 and packet generation unit 822. First reception unit 810a may be configured such that the demodulation unit is capable of outputting the received information to framing unit 830. In such cases, framing unit 830 may generate a first ETHER frame that further includes appended information in the IP packet. Stated differently, the configuration of first reception unit 810a may be the same as the configuration of reception module 310 illustrated in FIG. 9. For example, framing unit 830 generates a first ETHER frame by replacing the first TLV packet with a TS packet in the first ETHER frame illustrated in FIG. 16.

Second reception unit 810b outputs a second TS packet and a second ETHER frame.

Note that the structure of the first TS packet and the second TS packet may be the same as the TS packet that is inserted in the payload illustrated in FIG. 10A, for example.

For example, multiplexing unit 860 performs time division multiplexing on the first ETHER frame and the second ETHER frame, just like multiplexing unit 660 according to Embodiment 3.

Reception module 810 configured as described above is capable of outputting a first TS packet, an ETHER frame in which the first ETHER frame and the second ETHER frame are time division multiplexed, and a second TS packet. The first TS packet is output from output terminal 91, the time division multiplexed ETHER frame is output from output terminal 92, and the second TS packet is output from output terminal 93.

This allows transmission of ETHER frames on two channels and TS packets on two channels while reducing the number of output terminals of reception module 810. For example, even if decoder 70 includes only one ETHER frame input terminal, or decoder 70 does not support the TLV format, decoder 70 can be connected to reception module 810.

Delay adjustment unit 370 like that illustrated in FIG. 13 may be provided at an earlier stage than framing unit 830 of reception module 810. Furthermore, delay adjustment unit 370 may be provided at an earlier stage than the framing unit of second reception unit 810b. As a result, the TS packet generated by packet generation unit 822 is delayed in delay adjustment unit 370 so as to match the output rate of the ETHER frame, and output to framing unit 830. Framing unit 830 may generate and output an ETHER frame in which a plurality of TS packets are inserted into the payload, for example, illustrated in FIG. 10B through FIG. 10D.

Variation 2 of Embodiment 3

Figure 19:
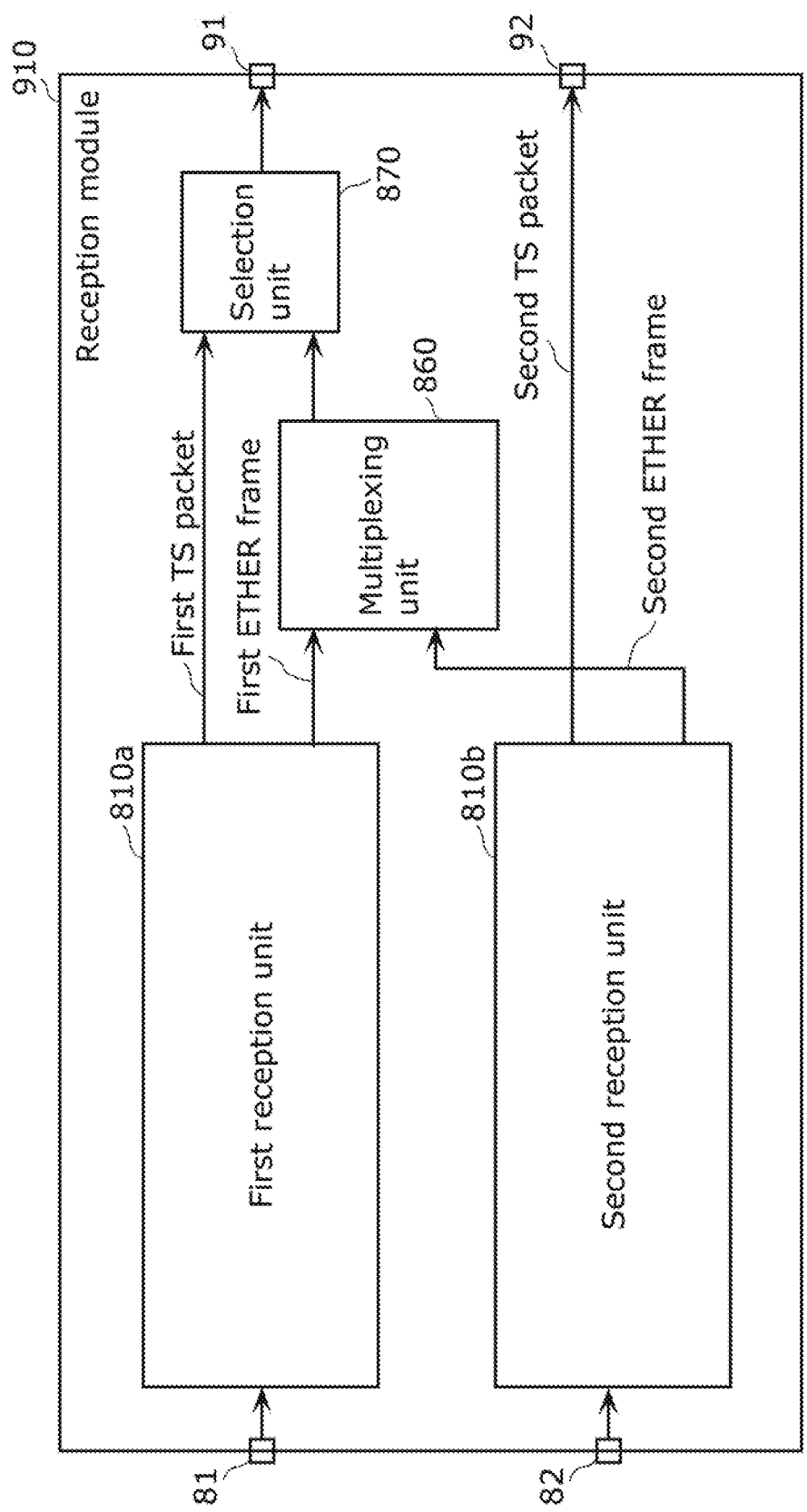
FIG. 19 is a block diagram illustrating a functional configuration of a reception module according to Variation 2 of Embodiment 3.

The configuration of the reception system according to the present variation will be described with reference to FIG. 19. FIG. 19 is a block diagram illustrating the functional configuration of reception module 910 according to the present variation. Reception module 910 according to the present variation differs from reception module 810 according to Variation 1 of Embodiment 3 mainly in that it includes selection unit 870. Hereinafter, the configuration of reception module 910 according to the present variation will be described with focus on the differences from reception module 810 according to Variation 1 of Embodiment 3.

As illustrated in FIG. 19, reception module 910 includes selection unit 870 in addition to reception module 810 according to Variation 1 of Embodiment 3. Reception module 910 includes two output terminals 91 and 92.

Selection unit 870 receives inputs of the first TS packet, which is the output of packet generation unit 822, and the time division multiplexed ETHER frame, which is the output of multiplexing unit 860, and selects data in a desired format and outputs it from output terminal 91. For example, selection unit 870 selects the desired data format in accordance with a setting from a component external to reception module 910. For example, selection unit 870 may select the desired data format in accordance with a setting from decoder 70 connected to reception module 910.

Selection unit 870 is connected between packet generation unit 822 and multiplexing unit 860 on one side and output terminal 91 on the other. Selection unit 870 is connected at a later stage than packet generation unit 822 and multiplexing unit 860.

The configuration of selection unit 870 may be the same as the configuration of selection unit 360 illustrated in FIG. 12, and as such, repeated description thereof will be omitted.

This makes it possible to reduce the number of terminals of reception module 910 because a common output terminal from which the first TS packet and the time division multiplexed ETHER frame are output can be shared.

The position at which selection unit 870 is connected is not limited to the position illustrated FIG. 19; selection unit 870 may be connected between packet generation unit 822 of first reception unit 810a, the packet generation unit of second reception unit 810b, and multiplexing unit 860 on one side and output terminal 91 on the other. Selection unit 870 may be connected at a later stage than packet generation unit 822 of first reception unit 810a, the packet generation unit of second reception unit 810b, and multiplexing unit 860. In such cases, selection unit 870 receives inputs of the data in the first TS packet format, the data in the time division multiplexed ETHER frame format, and the data in the second TS packet format, and selects the data in the desired format and outputs it from output terminal 91. This makes it possible to further reduce the number of terminals of reception module 910 compared to the configuration illustrated in FIG. 19.

Variation 3 of Embodiment 3

Figure 20:
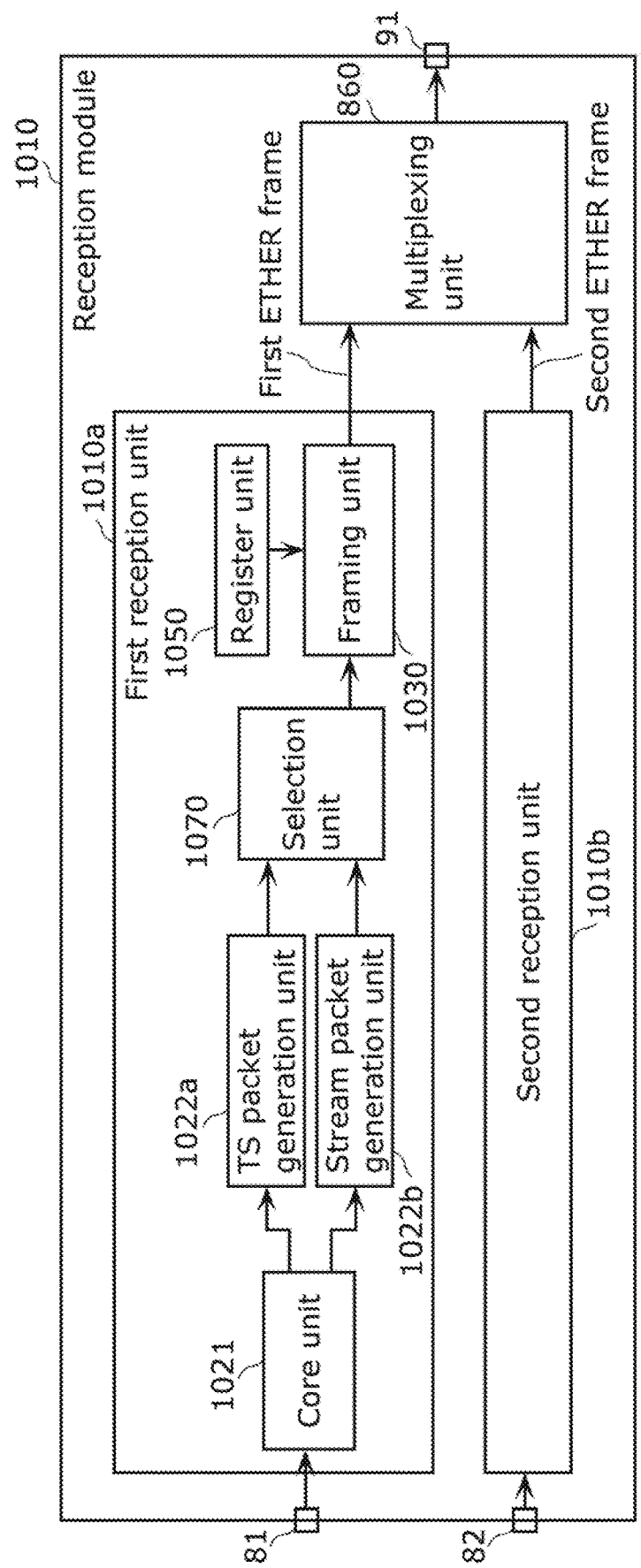
FIG. 20 is a block diagram illustrating a functional configuration of a reception module according to Variation 3 of Embodiment 3.

The configuration of the reception system according to the present variation will be described with reference to FIG. 20. FIG. 20 is a block diagram illustrating the functional configuration of reception module 1010 according to the present variation.

Reception module 1010 according to the present variation differs from reception module 600 according to Embodiment 3 mainly in that it includes both TS packet generation unit 1022a and stream packet generation unit 1022b as well as selection unit 1070. Hereinafter, the configuration of reception module 1010 according to the present variation will be described with focus on the differences from reception module 600 according to Embodiment 3.

As illustrated in FIG. 20, reception module 1010 includes first reception unit 1010a, second reception unit 1010b, multiplexing unit 860, two input terminals 81 and 82, and a single output terminal 91. The configurations of first reception unit 1010a and second reception unit 1010b may be the same, and as such, only the configuration of first reception unit 1010a will be described.

First reception unit 1010a includes core unit 1021, TS packet generation unit 1022a, stream packet generation unit 1022b, selection unit 1070, framing unit 1030, and register unit 1050.

Core unit 1021 converts the baseband signal or IF signal input to input terminal 81 from an analog signal to a digital signal and demodulates the analog-to-digital converted baseband signal or IF signal. Core unit 1021 may further perform error correction processing. Core unit 1021 outputs the demodulated baseband signal or IF signal to TS packet generation unit 1022a and stream packet generation unit 1022b.

When TS packet generation unit 1022a obtains a signal whose broadcast format is a TS packet from core unit 1021, TS packet generation unit 1022a generates a TS packet from the signal and outputs the generated TS packet to selection unit 1070. TS packet generation unit 1022a may determine whether the broadcast format is a TS packet.

When stream packet generation unit 1022b obtains a signal whose broadcast format is a TLV packet from core unit 1021, stream packet generation unit 1022b generates a TLV packet from the signal and outputs the generated TLV packet to selection unit 1070. Stream packet generation unit 1022b may determine whether the broadcast format is a TLV packet.

TS packet generation unit 1022a and stream packet generation unit 1022b are connected to each other in parallel between core unit 1021 and selection unit 1070.

Selection unit 1070 receives inputs of a TS packet, which is the output of TS packet generation unit 1022a, and a TLV packet, which is the output of stream packet generation unit 1022b, and selects data in a desired format and outputs it to framing unit 1030. Selection unit 1070 may, for example, select a desired data format in accordance with a setting from a component external to reception module 1010, or, upon obtaining data from TS packet generation unit 1022a or stream packet generation unit 1022b, select the obtained data and output it to framing unit 1030.

Selection unit 1070 is connected between TS packet generation unit 1022a and stream packet generation unit 1022b on one side and framing unit 1030 on the other. Selection unit 1070 is connected at a later stage than TS packet generation unit 1022a and stream packet generation unit 1022b and at an earlier stage than framing unit 1030.

The configuration of selection unit 1070 may be the same as the configuration of selection unit 360 illustrated in FIG. 12, and as such, repeated description thereof will be omitted.

Framing unit 1030 ETHER-frames the signal output from selection unit 1070 to generate an ETHER frame in which the signal is inserted. Framing unit 1030 of first reception unit 1010a and the framing unit of second reception unit 1010b set at least one of the destination IP address values in the IP packet headers or the destination port values in the UDP packet headers to mutually different values.

Multiplexing unit 860 performs multiplexing (ETHER multiplexing) on the first ETHER frame output from framing unit 1030 of first reception unit 1010a and the second ETHER frame output from the framing unit of second reception unit 1010b. Multiplexing unit 860 outputs the first ETHER frame and the second ETHER frame as a single stream by performing time division multiplexing.

Decoder 70 is capable of separating the data of the two channels by discriminating at least one of the destination IP address value of the IP packet header or the destination port value of the UDP packet header of the time division multiplexed ETHER frame. Decoder 70 is capable of separating the two data even when, for example, the first ETHER frame is a frame in which a TS packet is ETHER framed and the second ETHER frame is a frame in which a TLV packet is ETHER framed.

This allows reception module 1010 to, via multiplexing unit 860, time division multiplex an ETHER frame that is a frame in which a TS packet is ETHER framed and an ETHER frame that is a frame in which a TLV packet is ETHER framed, thereby increasing flexibility to the corresponding broadcasting scheme. Moreover, since reception module 1010 includes multiplexing unit 860, the number of output terminals 91 can be reduced.

Framing unit 1030 may generate an ETHER frame in which appended information including received information is inserted. First reception unit 1010a and second reception unit 1010b may be configured to be able to insert appended information. More specifically, the received information may be output from core unit 1021 to framing unit 1030.

Reception module 1010 may include a delay adjustment unit (for example, delay adjustment unit 370 illustrated in FIG. 13) between TS packet generation unit 1022a and selection unit 1070.

Variation 4 of Embodiment 3

Figure 21:
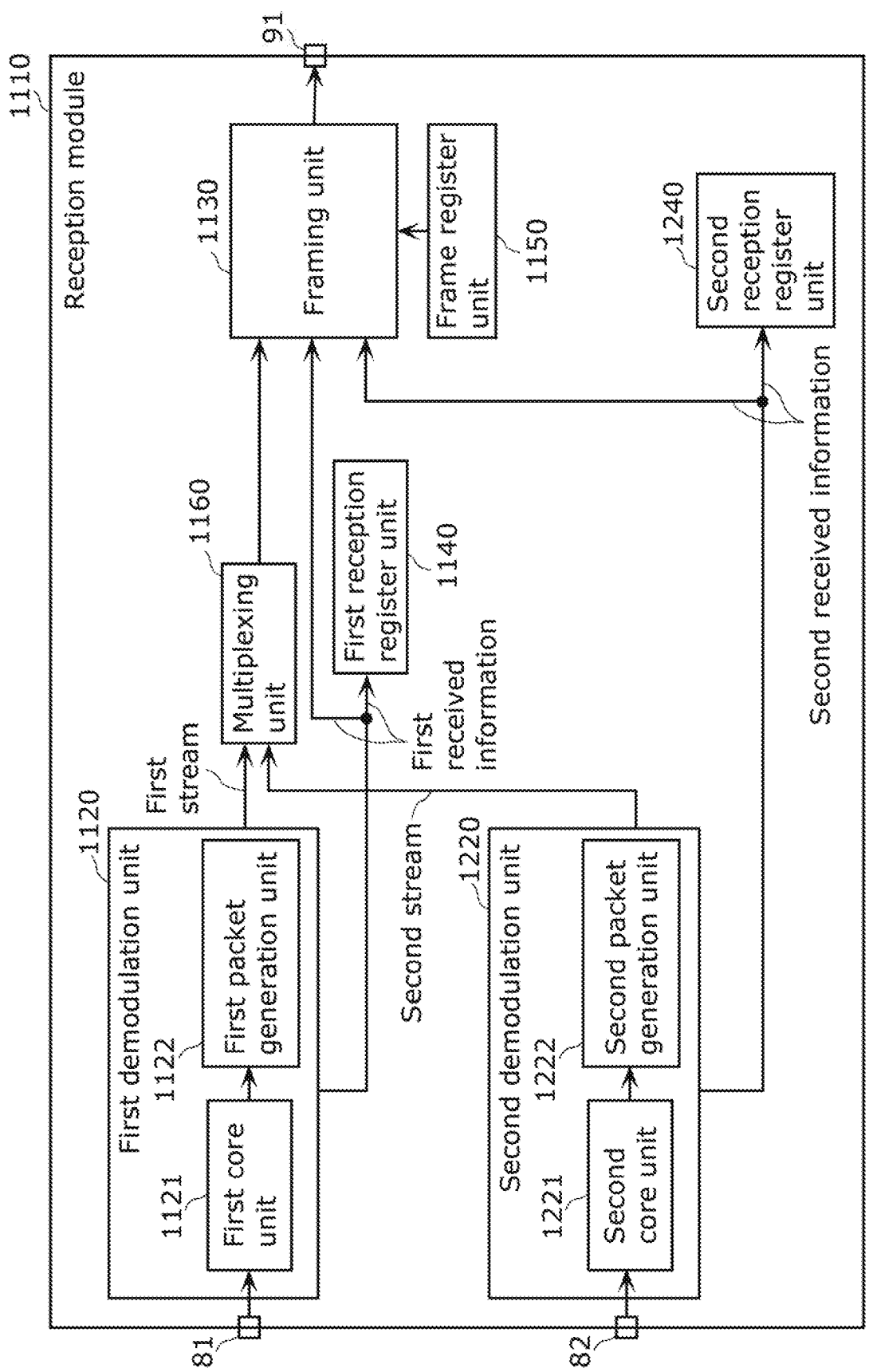
FIG. 21 is a block diagram illustrating a functional configuration of a reception module according to Variation 4 of Embodiment 3.

The configuration of the reception system according to the present variation will be described with reference to FIG. 21 and FIG. 22. FIG. 21 is a block diagram illustrating the functional configuration of reception module 1110 according to the present variation. Reception module 1110 according to the present variation differs from reception module 100 according to the variation of Embodiment 1 mainly in that it includes multiplexing unit 1160. Hereinafter, the configuration of reception module 1110 according to the present variation will be described with focus on the differences from reception module 100 according to the variation of Embodiment 1.

As illustrated in FIG. 21, reception module 1110 includes first demodulation unit 1120, framing unit 1130, first reception register unit 1140, frame register unit 1150, multiplexing unit 1160, second demodulation unit 1220, and second reception register unit 1240. For example, reception module 1110 includes two input terminals 81 and 82, but includes a single framing unit 1130 and a single output terminal 91. Stated differently, the number of framing units 1130 and the number of output terminals is less than the number of input terminals 81 and 82 (two). First demodulation unit 1120 (first core unit 1121 and first packet generation unit 1122), first reception register unit 1140, frame register unit 1150, second demodulation unit 1220 (second core unit 1221 and second packet generation unit 1222), and second reception register unit 1240 illustrated in FIG. 21 may have the same configuration as first demodulation unit 120 (first core unit 121 and first packet generation unit 122), first reception register unit 140, first frame register unit 150, second demodulation unit 220 (second core unit 221 and second packet generation unit 222), and second reception register unit 240 illustrated in FIG. 6, respectively, and as such, repeated description thereof will be omitted. Second packet generation unit 1222 outputs the generated second TS packet (second stream) to multiplexing unit 1160.

Multiplexing unit 1160 receives inputs of a first TS packet (first stream) output from first packet generation unit 1122 and a second TS packet output from second packet generation unit 1222, and performs multiplexing on the input first and second streams. Multiplexing unit 1160, for example, performs time division multiplexing. The multiplexed TS packets are output to framing unit 1130.

Multiplexing unit 1160 is connected between first packet generation unit 1122 and second packet generation unit 1222 on one side and framing unit 1130 on the other.

Framing unit 1130 generates an ETHER frame that includes the multiplexed TS packet in the payload and the appended information including the first received information, the second received information, and the register value in the IP packet. In the ETHER frame generated in this way, for example, in the ETHER frame illustrated in FIG. 7, a multiplexed TS packet is inserted in place of the TLV packet.

This makes it possible to output two channels (two systems) of TS packets using a single output terminal 91.

Next, one example of an ETHER frame generated in reception module 1110 illustrated in FIG. 21 will be described with reference to FIG. 22. FIG. 22 illustrates one example of a structure of an ETHER frame generated by reception module 1110 according to the present variation.

Figure 22:
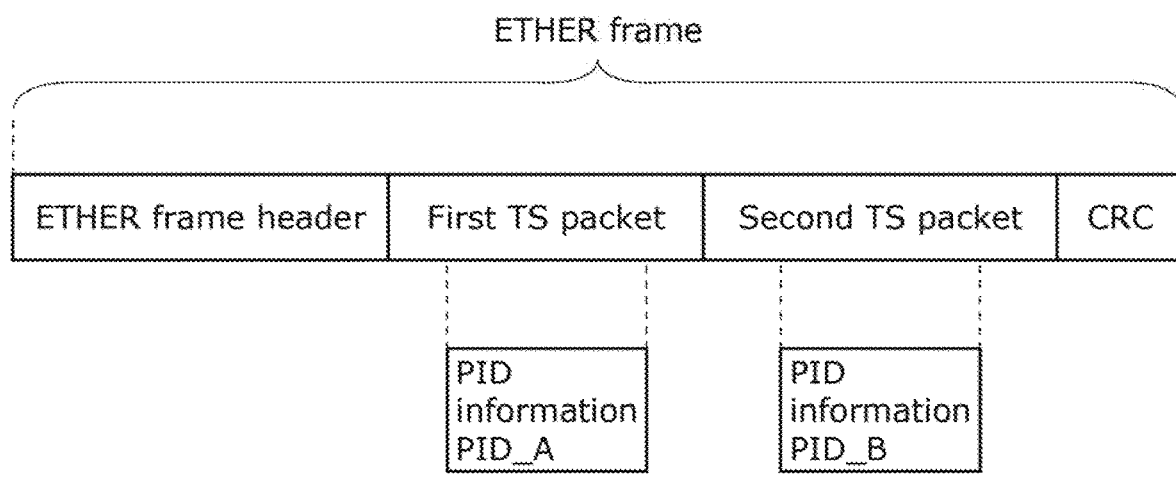
FIG. 22 illustrates one example of a structure of an ETHER frame generated by the reception module according to Variation 4 of Embodiment 3.

As illustrated in FIG. 22, an ETHER frame may include a first TS packet and a second TS packet in the payload. For example, when the first TS packet and the second TS packet are TS packets in mutually different channels, the packet ID (PID) information included in the first TS packet and the PID information included in the second TS packet are mutually different. Therefore, decoder 70 may recognize the first TS packet and the second TS packet stored in a single ETHER frame using the PID information.

When generating the ETHER frame illustrated in FIG. 22, in the step of generating of a first packet, a first packet including a plurality of TS packets is generated. At least two TS packets among the plurality of TS packets include mutually different PID information.

This enables decoder 70 to identify a plurality of TS packets using the PID information originally included in the TS packets.

In addition, by applying this technique, when the section occupied by the TLV packet illustrated in FIG. 16 is used as a TS packet, the first ETHER frame and the second ETHER frame are exemplified as being identified with different UDP packet headers or IP packet headers, but a configuration may be employed in which the first ETHER frame and the second ETHER frame are identifiable by referring to the PID in the TS packet, even if the UDP packet header and the IP packet header are the same.

Embodiment 4

4-1. Reception System Configuration

Figure 23:
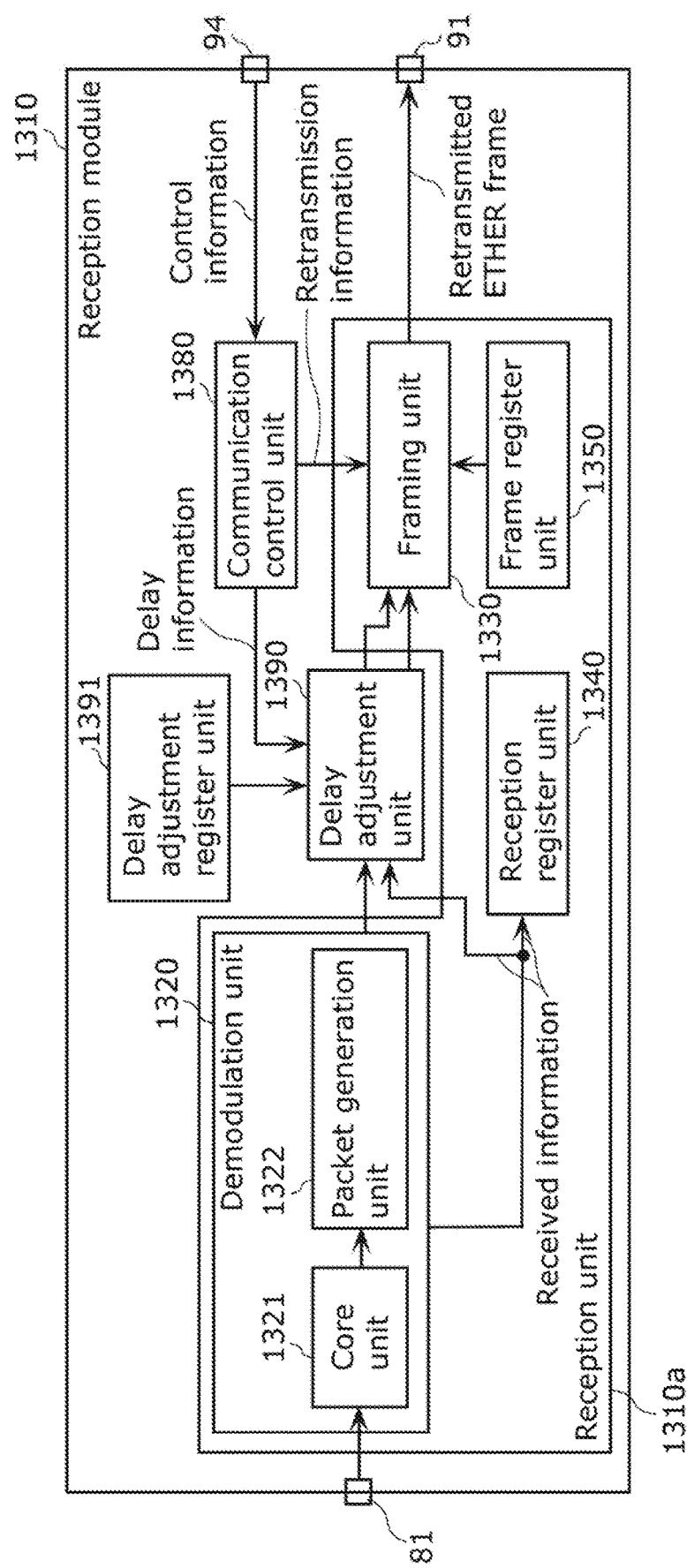
FIG. 23 is a block diagram illustrating a functional configuration of a reception module according to Embodiment 4.

First, a configuration of the reception system according to the present embodiment will be described with reference to FIG. 23. FIG. 23 is a block diagram illustrating the functional configuration of reception module 1310 according to the present embodiment. Reception module 1310 according to the present embodiment differs from reception module 10 of Embodiment 1 mainly in that it includes delay adjustment unit 1390 that delays data input to framing unit 1330 based on control information from input terminal 94. Hereinafter, the configuration of reception module 1310 according to the present embodiment will be described with focus on the differences from reception module 10 according to Embodiment 1. Decoder 70 may be connected to a single reception module 1310 or to a plurality of reception modules.

As illustrated in FIG. 23, reception module 1310 includes reception unit 1310a, communication control unit 1380, delay adjustment unit 1390, delay adjustment register unit 1391, input terminals 81 and 94, and output terminal 91. The configuration of reception unit 1310a may be the same as that of reception module 10 of Embodiment 1. For example, demodulation unit 1320 (core unit 1321 and packet generation unit 1322), framing unit 1330, reception register unit 1340, and frame register unit 1350 illustrated in FIG. 23 may have the same configuration as demodulation unit 20 (core unit 21 and packet generation unit 22), framing unit 30, reception register unit 40, and frame register unit 50 illustrated in FIG. 1, respectively.

Communication control unit 1380 receives an input of control information via input terminal 94. The control information is, for example, the information output from the later-stage decoder 70, and includes information about the generation or output of an ETHER frame. The control information includes, for example, identification information and delay information for reception module 1310 to be controlled. The identification information is, for example, unique to reception module 1310. The delay information is information that indicates the amount of delay in delay adjustment unit 1390. The control information may also include information based on the obtainment status of the ETHER frame at decoder 70 (for example, the degradation status of the ETHER frame). For example, the information based on the obtainment status may be information indicating that the obtained ETHER frame is degraded beyond a predetermined level, may be information indicating that ETHER frames collided with each other, and may be information indicating that the ETHER frame is to be retransmitted.

When it is necessary to retransmit the ETHER frame, communication control unit 1380 outputs retransmission information indicating that the ETHER frame is to be retransmitted to framing unit 1330, and outputs, to delay adjustment unit 1390, delay information indicating that the data output from packet generation unit 1322 to framing unit 1330 is to be delayed for the time required for the retransmission.

Upon obtaining the retransmission information, framing unit 1330 retransmits the corresponding ETHER frame. Delay adjustment unit 1390 delays the data from packet generation unit 1322 for the amount of time indicated by the delay information, and then outputs the data to framing unit 1330.

The delay information included in the control information may be, for example, information indicating the output timing of the ETHER frame in reception module 1310. In such cases, communication control unit 1380 outputs the delay information to delay adjustment unit 1390. Communication control unit 1380 may output the identification information to delay adjustment unit 1390.

Delay adjustment unit 1390 compares the identification information with the identification set value stored in delay adjustment register unit 1391, and if the value of the identification information matches the delay set value, controls the amount of delay for the input to framing unit 1330 based on the delay information. The data output from delay adjustment unit 1390 is ETHER framed in framing unit 1330. The identification set value is identification information for identify the reception module that is set in advance. The decoder stores the identification set value of each reception module in advance.

As described above, the reception system according to the present embodiment is configured to enable bidirectional communication between reception module 1310 and decoder 70.

4-2. Reception System Operation

Figure 24:
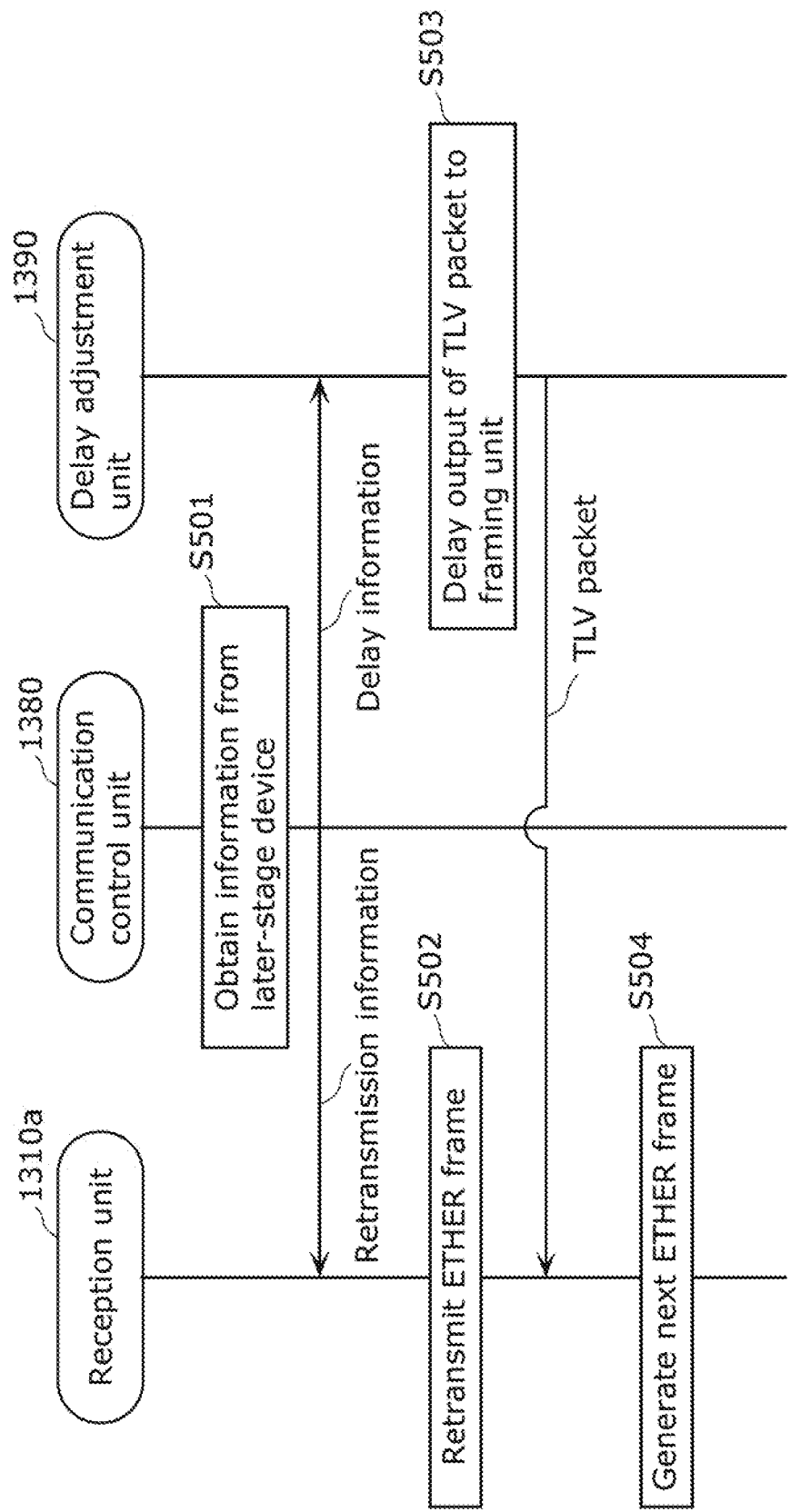
FIG. 24 is a sequence diagram of operations performed by elements included in the reception module according to Embodiment 4.

Next, a retransmission operation performed by reception module 1310 described above will be described with reference to FIG. 24. FIG. 24 is a sequence diagram of operations performed by elements included in reception module 1310 according to the present embodiment. FIG. 24 describes an operation whereby framing unit 1330 retransmits an ETHER frame. Note that the controlling of the output timing of the ETHER frame in framing unit 1330 will be described in a variation of Embodiment 4.

As illustrated in FIG. 24, after the ETHER frame is output from framing unit 1330, communication control unit 1380 obtains information from a later-stage device (S501). In the present embodiment, communication control unit 1380 obtains information indicating that the ETHER frame is to be retransmitted from decoder 70, which is one example of the later-stage device.

Based on this information, communication control unit 1380 outputs retransmission information to framing unit 1330 of reception unit 1310a and outputs delay information to delay adjustment unit 1390.

Framing unit 1330 of reception unit 1310a retransmits the corresponding ETHER frame based on the retransmission information (S502). Delay adjustment unit 1390 delays the output of the TLV packet (one example of data from packet generation unit 1322) to framing unit 1330 based on the delay information (S503). Delay adjustment unit 1390 delays the TLV packet from packet generation unit 1322 by an amount of delay indicated by the delay information, and then outputs the TLV packet to framing unit 1330 of reception unit 1310a.

Next, framing unit 1330 of reception unit 1310a generates the next ETHER frame by ETHER framing the TLV packet obtained from delay adjustment unit 1390 (S504), and outputs the generated ETHER frame.

As a result, when the ETHER frame obtained by decoder 70 contains errors due to transmission distortion, or when ETHER frames collide in the Ethernet, the ETHER frame can be supplemented by retransmitting the ETHER frame.

Reception module 1310 may be configured to include two or more input terminals and be capable of multiplexing an ETHER frame resulting from ETHER framing a TS packet and an ETHER frame resulting from ETHER framing a TLV packet and outputting them as a single stream.

Although the present embodiment includes an example in which a TLV packet is ETHER framed, a configuration in which a TS packet is ETHER framed is also acceptable.

Delay adjustment unit 1390 is not limited to being arranged between packet generation unit 1322 and framing unit 1330. For example, delay adjustment unit 1390 may be arranged between framing unit 1330 and output terminal 91 or between core unit 1321 and packet generation unit 1322.

Note that input terminal 94 is a group of one or more terminals, and includes, for example, one or more terminal pins.

Variation of Embodiment 4

Figure 25:
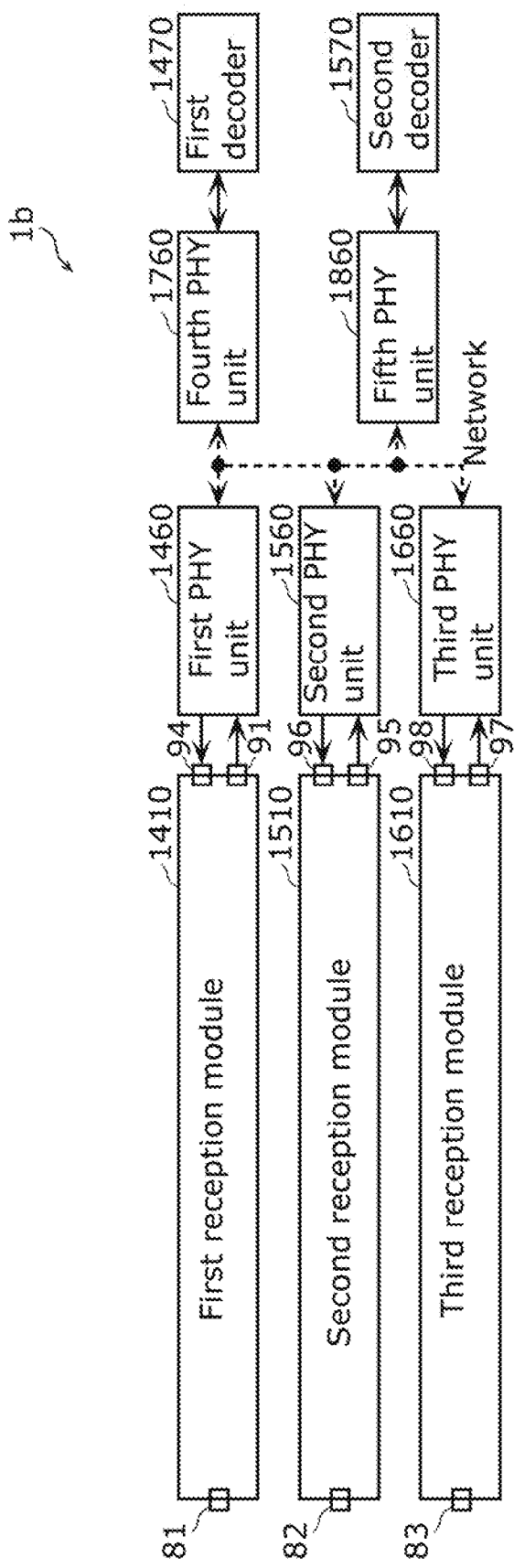
FIG. 25 is a block diagram illustrating a configuration of a reception system according to a variation of Embodiment 4.

Next, a reception system according to the present variation will be described with reference to FIG. 25 and FIG. 26. First, the configuration of the reception system according to the present variation will be described with reference to FIG. 25. FIG. 25 is a block diagram illustrating the functional configuration of reception system 1b according to the present variation. Reception system 1b according to the present variation differs from the reception system according to Embodiment 4 in that a single decoder is connected to a plurality of reception modules, and the ETHER frame output timing of each reception module is controlled.

As illustrated in FIG. 25, reception system 1b includes a first reception module 1410/first PHY unit 1460 pair, a second reception module 1510/second PHY unit 1560 pair, a third reception module 1610/third PHY unit 1660 pair, a fourth PHY unit 1760/first decoder 1470 pair, and a fifth PHY unit 1860/second decoder 1570 pair. First PHY unit 1460, second PHY unit 1560, and third PHY unit 1660 are communicably connected to fourth PHY unit 1760 and fifth PHY unit 1860 via a network.

The configuration of each of the first through third reception modules 1410 through 1610 may be the same as, for example, the configuration of reception module 1310 illustrated in FIG. 23. Stated differently, each of the first through third reception modules 1410 through 1610 can delay the output timing of the ETHER frame output from framing unit 1330 based on the control information from the decoder. First reception module 1410 includes input terminals 81 and 94 and output terminal 91. Second reception module 1510 includes input terminals 82 and 96 and output terminal 95. Third reception module 1610 includes input terminals 83 and 98 and output terminal 97.

Each of the first through fifth PHY units 1460 through 1860 is a network communication interface, and, for example, includes a PHY chip. Each of the first through fifth PHY units 1460 through 1860 implements predetermined signal processing (for example, modulation) on obtained data and outputs the result.

First decoder 1470 is connected to fourth PHY unit 1760. Second decoder 1570 is connected to fifth PHY unit 1860. Each of first decoder 1470 and second decoder 1570 stores in advance an identification set value, which is a value of a setting for identification, for each of the first through third reception modules 1410 through 1610.

As described above, each of first decoder 1470 and second decoder 1570 according to the present embodiment is communicatively connected to each of the first through third reception modules 1410 through 1610. Here, it is desirable to avoid signal collision in the network. In view of this, in the present variation, the amount of delay of the reception modules is controlled using delay adjustment units 1390 included in the first through third reception modules 1410 through 1610.

Note that the number of reception modules included in reception system 1b is not limited to three, and may be four or more. The number of reception modules should be such that, for example, the bus width of the network can be effectively utilized up to the maximum bandwidth. For example, by effectively utilizing the bus width of the network to its maximum bandwidth, it is possible to connect a plurality of reception modules and a plurality of decoders simultaneously, as illustrated in FIG. 25, for example. By connecting a plurality of reception modules, each reception module can be made to perform processing for broadcast waves of different channels or different broadcasting schemes. For example, it is possible to handle (for example, have present) frames (for example, ETHER frames) based on different channels or based on broadcast waves of different broadcasting schemes on a single network as illustrated in FIG. 25.

This allows a plurality of reception modules to be connected to a decoder capable of processing a plurality of broadcast streams, thus maximizing the use of the decoder's specifications. Moreover, with this configuration, since the number of connections between the reception module and the decoder is flexible, this makes the construction of a network of reception modules easier.

Figure 26:
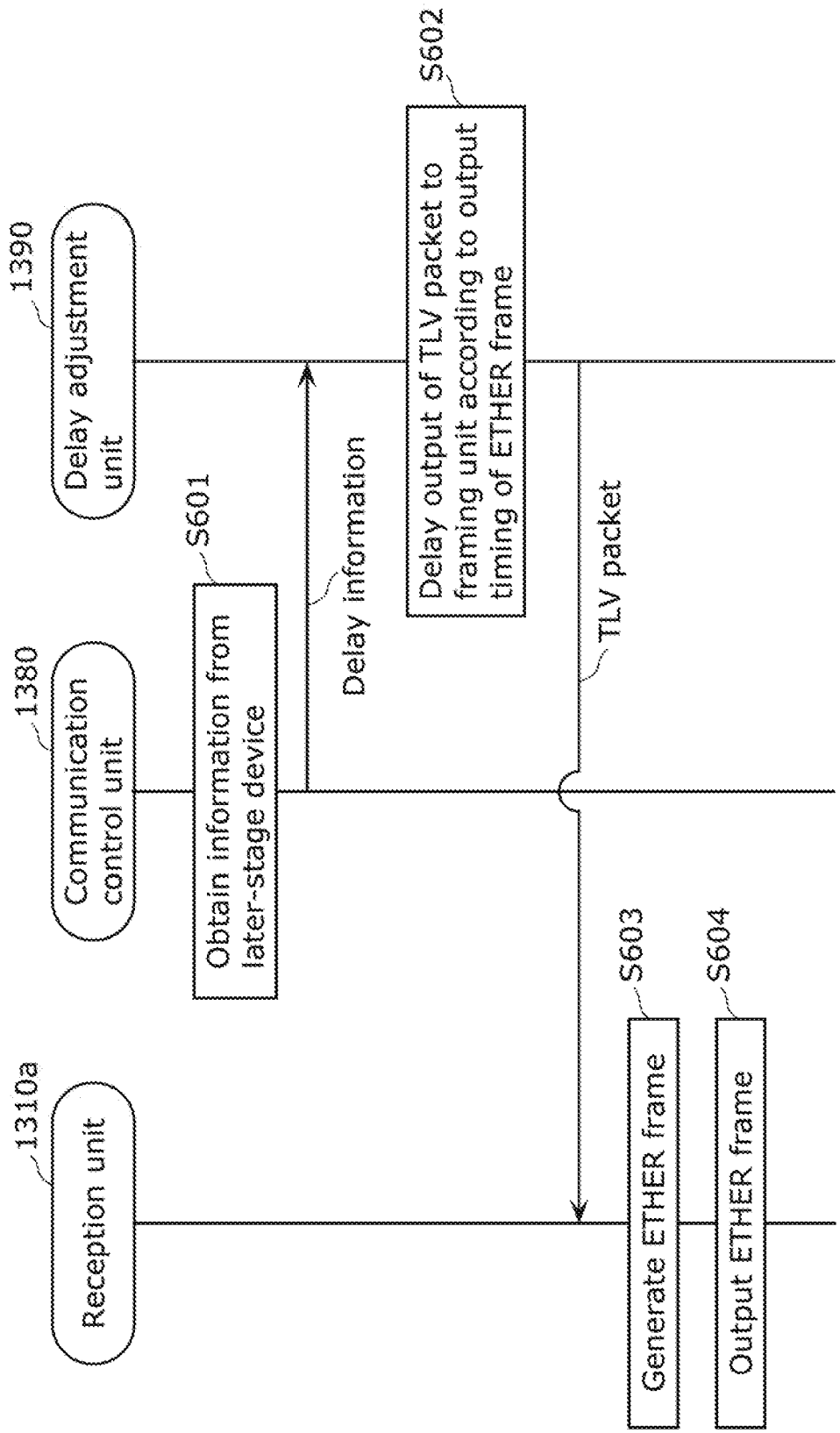
FIG. 26 is a sequence diagram of operations performed by elements included in a reception module according to the variation of Embodiment 4.

FIG. 26 is a sequence diagram of operations performed by elements included in the reception module according to the present variation. Note that FIG. 26 illustrates operations of one of the first through third reception modules 1410 through 1610 illustrated in FIG. 25.

As illustrated in FIG. 26, after the ETHER frame is output from framing unit 1330, communication control unit 1380 obtains information from a later-stage device (S601). In the present variation, communication control unit 1380 obtains delay information (for example, the output timing of the ETHER frame) and identification information for identifying the reception module that output the ETHER frame at that output timing from a decoder, which is one example of the later-stage device. Communication control unit 1380 outputs this information to delay adjustment unit 1390.

Delay adjustment unit 1390 compares the identification set value stored in delay adjustment register unit 1391 with the identification information, and if they match, determines that the delay information is information corresponding to the module in which it is included, and delays the output of the TLV packet input from packet generation unit 1322 to framing unit 1330 based on the delay information. Delay adjustment unit 1390 can be said to delay the output of the TLV packet to framing unit 1330 according to the output timing of the ETHER frame (S602). Step S602 is one example of the step of delaying. In the delaying step, for example, generation of the ETHER frame is delayed based on information from the later-stage device that processes the ETHER frame. When delay adjustment unit 1390 is connected between framing unit 1330 and output terminal 91, in the delay step, the sending of the ETHER frame to the later-stage device is delayed.

Next, delay adjustment unit 1390 delays the TLV packet by an amount of delay based on the delay information, and then outputs the delayed TLV packet to framing unit 1330 of reception unit 1310a.

Next, framing unit 1330 of reception unit 1310a obtains the delayed TLV packet from delay adjustment unit 1390, generates an ETHER frame that is a frame in which the obtained TLV packet is ETHER framed (S603), and outputs the generated ETHER frame to the decoder (S604).

Delay information indicating different amounts of delay (or output timings) is output to each reception module. Stated differently, with reception system 1b, the amount of delay (or output timing) can be individually controlled for each reception module. This prevents the ETHER frames output from the reception modules from colliding on the network.

Other Embodiments

Although the above describes embodiments and variations thereof (hereinafter referred to simply as "embodiments, etc."), the present disclosures is not limited to the embodiments, etc. Various modifications of the embodiments as well as embodiments resulting from arbitrary combinations of elements of the embodiments that may be conceived by those skilled in the art are included within the scope of the present disclosure so long as they do not depart from the essence of the present disclosure.

Figure 27:
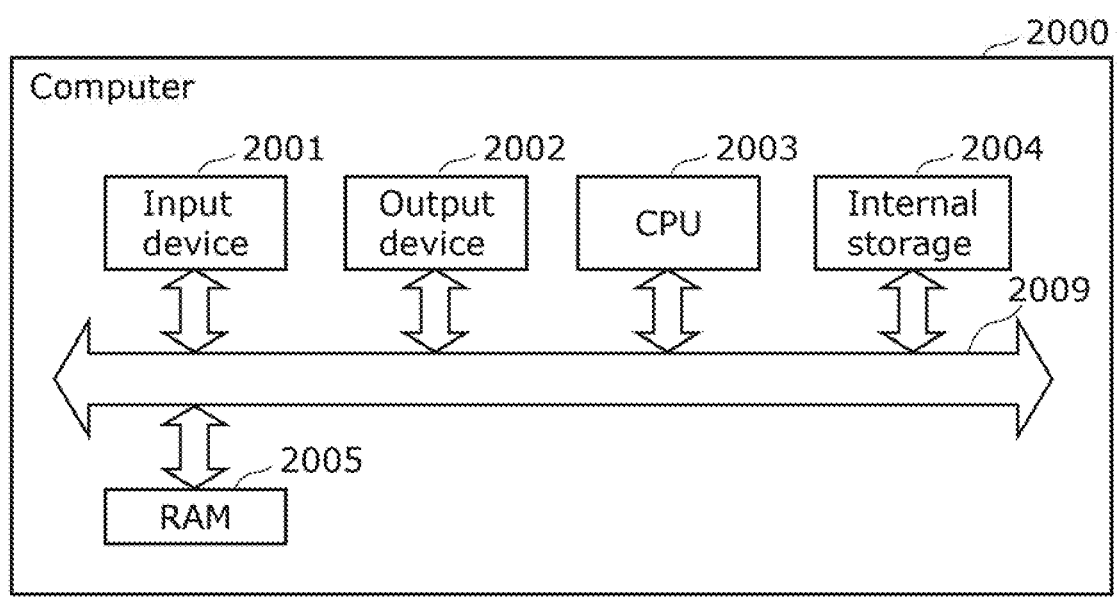
FIG. 27 is a diagram illustrating an example of a hardware configuration of a computer that realizes the functions of a reception module according to the embodiments via software.

For example, the hardware configuration of the elements included in the reception module according to the above embodiments, etc., is not particularly limited. For example, the elements may be configured as a computer. Next, one example of such a hardware configuration will be given with reference to FIG. 27. FIG. 27 is a diagram illustrating an example of a hardware configuration of computer 2000 that realizes the functions of a reception module according to the above embodiments, etc., via software.

As illustrated in FIG. 27, computer 2000 includes input device 2001, output device 2002, CPU 2003, internal storage 2004, RAM 2005, and bus 2009. Input device 2001, output device 2002, CPU 2003, internal storage 2004, and RAM 2005 are connected by bus 2009.

Input device 2001 is a device for inputting signals to computer 2000, and in addition to a signal input terminal, may be a device that serves as a user interface, such as an input button, a touch pad, or a touch panel display. A device that serves as a user interface is one that accepts user operations. In addition to operations via contact by the user, input device 2001 may be configured to accept operations via voice and remote operations via a remote control or the like. For example, the reception module may be connected to this input device 2001 and obtain various set values and the like. Input device 2001 may be realized by input terminals 81 through 83 and 94 via which various outside information is input.

Output device 2002 is a device that outputs signals from computer 2000, and in addition to a signal output terminal, may be a device that serves as a user interface, such as a speaker or display. Output device 2002 may be realized by output terminals 91 through 93 that output the generated frames out of computer 2000.

Internal storage 2004 is flash memory or the like. Internal storage 2004 may store in advance at least one of a program for realizing the functions of the reception module or an application that utilizes the functional configuration of the reception module.

RAM 2005 is random access memory and is used for storing data and the like when a program or application is executed.

CPU 2003 is a central processing unit, which copies a program or application stored in internal storage 2004 to RAM 2005, and reads instructions contained in the program or application sequentially from RAM 2005 to execute the program.

Each of the elements of each reception module may be implemented by at least some of the elements of computer 2000 described above.

In the embodiments and variations other than Embodiment 1, there is no requirement that the transmission frame (for example, the ETHER frame) generated by the framing unit includes appended information (for example, received information).

The divisions of the functional blocks in the block diagrams are mere examples; a plurality of functional blocks may be realized as a single functional block, a single functional block may be divided into a plurality of functional blocks, or some functions may be transferred to other functional blocks. The functions of a plurality of function blocks having similar functions may be processed by a single piece of hardware or software in parallel or by time-division.

The order of processes described in the flowcharts and sequence diagrams in the above embodiments, etc., are mere examples. The order of the processes may be changed, and the processes may be performed in parallel.

Part of the elements of the reception modules described above may be configured from one system LSI (Large Scale Integration) circuit. A system LSI circuit is a multifunctional LSI circuit manufactured by integrating a plurality of units on a single chip, and is specifically a computer system including, for example, a microprocessor, ROM, and RAM. A computer program is stored in the RAM. The system LSI circuit achieves its functions by the microprocessor operating in accordance with the computer program.

Part of the elements of the reception modules described above may be configured from an IC card or a stand-alone module that can be removed and attached to each device. The IC card or the module is a computer system including, for example, a microprocessor, ROM, and RAM. The IC card or the module may include the multifunctional LSI circuit described above. The IC card or the module achieves its function as a result of the microprocessor operating according to the computer program. The IC card or the module may be tamperproof.

Part of the elements of the reception modules described above may also be realized as the computer program or the digital signal stored on computer-readable storage media, such as a flexible disk, hard disk, CD-ROM, MO, DVD, DVD-ROM, DVD-RAM, DVD-RAM, BD (Blu-ray (registered trademark) Disc), or semiconductor memory. Part of the elements of the reception modules described above may also be the digital signal stored on the above mentioned storage media.

Part of the elements of the reception modules described above may also be realized by transmitting the computer program or the digital signal, for example, via an electric communication line, a wireless or wired line, a network such as the Internet, or data broadcasting.

The content of the present disclosure may be realized as the methods described above. The content of the present disclosure may be realized as a computer program realizing these methods with a computer, or a digital signal of the computer program.

The present disclosure may be a computer system including memory storing a computer program and a microprocessor operating according to the computer program.

The computer program or the digital signal may be implemented by an independent computer system by being stored on the storage media and transmitted, or sent via the network.

Moreover, the embodiments, etc., may be combined.

INDUSTRIAL APPLICABILITY

The present disclosure is applicable to reception systems for receiving digital broadcast waves and the like.

The invention claimed is:

1. A frame generation method comprising:
demodulating a first digital broadcast signal that is based on a received digital broadcast wave;
generating a first packet including content information obtained in the demodulating of the first digital broadcast signal; and
generating a first transmission frame including appended information and the first packet, the appended information including first received information obtained in the demodulating of the first digital broadcast signal, the first received information being information other than the content information,
wherein the first received information includes at least interference signal detection information.

2. The frame generation method according to claim 1, wherein the first received information further includes at least one of a signal quality of the digital broadcast wave, or an error ratio of the first digital broadcast signal, the error ratio being calculated in the demodulating of the first digital broadcast signal.

3. A frame generation method comprising:
demodulating a first digital broadcast signal that is based on a received digital broadcast wave;
generating a first packet including content information obtained in the demodulating of the first digital broadcast signal; and
generating a first transmission frame including appended information and the first packet, the appended information including first received information obtained in the demodulating of the first digital broadcast signal, the first received information being information other than the content information,
wherein the generating of the first packet includes generating the first packet including a plurality of transport stream (TS) packets, and
the generating of the first transmission frame includes generating the first transmission frame further including information indicating a total number of the plurality of TS packets.

4. The frame generation method according to claim 3, wherein at least two TS packets among the plurality of TS packets include mutually different packet ID (PID) information.

5. A frame generation method comprising:
demodulating a first digital broadcast signal that is based on a received digital broadcast wave;
generating a first packet including content information obtained in the demodulating of the first digital broadcast signal;
generating a first transmission frame including appended information and the first packet, the appended information including first received information obtained in the demodulating of the first digital broadcast signal, the first received information being information other than the content information; and
demodulating a second digital broadcast signal different than the first digital broadcast signal,
wherein the appended information further includes second received information obtained in the demodulating of the second digital broadcast signal.

6. A frame generation method comprising:
demodulating a first digital broadcast signal that is based on a received digital broadcast wave;
generating a first packet including content information obtained in the demodulating of the first digital broadcast signal;
generating a first transmission frame including appended information and the first packet, the appended information including first received information obtained in the demodulating of the first digital broadcast signal, the first received information being information other than the content information; and
selectively outputting, as the first packet, the first transmission frame including a transport stream (TS) packet or the TS packet.

7. A frame generation method comprising:
demodulating a first digital broadcast signal that is based on a received digital broadcast wave;
generating a first packet including content information obtained in the demodulating of the first digital broadcast signal;
generating a first transmission frame including appended information and the first packet, the appended information including first received information obtained in the demodulating of the first digital broadcast signal, the first received information being information other than the content information; and demodulating a second digital broadcast signal different than the first digital broadcast signal;

generating a second packet including content information obtained in the demodulating of the second digital broadcast signal;

generating a second transmission frame including appended information and the second packet, the appended information including second received information obtained in the demodulating of the second digital broadcast signal, the second received information being information other than the content information; and multiplexing the first transmission frame and the second transmission frame, wherein the generating of the first transmission frame includes generating the first transmission frame including first output destination information about an output destination of the first packet, and the generating of the second transmission frame includes generating the second transmission frame including second output destination information about an output destination of the second packet, the second output destination information being different than the first output destination information.

8. The frame generation method according to claim 7, wherein each of the first transmission frame and the second transmission frame is an ETHER frame, and each of the first output destination information and the second output destination information includes at least one of destination information in an internet protocol (IP) packet header included in the ETHER frame or destination port information in a user datagram protocol (UDP) header included in the ETHER frame.

9. A frame generation device comprising:

a demodulation core unit configured to demodulate a digital broadcast signal that is based on a received digital broadcast wave;

a packet generation unit configured to generate a packet including content information obtained via demodulation by the demodulation core unit;

a frame generation unit configured to generate a transmission frame including appended information and the packet, the appended information including received information obtained via the demodulation by the demodulation core unit, the received information being information other than the content information; and a selection unit configured to selectively output, as the packet, the transmission frame including a transport stream (TS) packet or the TS packet.

10. A frame generation device comprising:

a first demodulation core unit configured to demodulate a first digital broadcast signal that is based on a received digital broadcast wave;

a first packet generation unit configured to generate a first packet including content information obtained via demodulation by the first demodulation core unit;

a first frame generation unit configured to generate a first transmission frame including appended information and the first packet, the appended information including first received information obtained via the demodulation by the first demodulation core unit, the first received information being information other than the content information;

a second demodulation core unit configured to demodulate a second digital broadcast signal different than the first digital broadcast signal;

a second packet generation unit configured to generate a second packet including content information obtained by the second demodulation core unit;

a second frame generation unit configured to generate a second transmission frame including appended information and the second packet, the appended information including second received information obtained by the second demodulation core unit, the second received information being information other than the content information; and a multiplexing unit configured to multiplex the first transmission frame and the second transmission frame, wherein the first frame generation unit is configured to generate the first transmission frame including first output destination information about an output destination of the first packet, and the second frame generation unit is configured to generate the second transmission frame including second output destination information about an output destination of the second packet, the second output destination information being different than the first output destination information.

* * * * *